US008115877B2

(12) United States Patent
Blatchley et al.

(10) Patent No.: US 8,115,877 B2
(45) Date of Patent: Feb. 14, 2012

(54) SYSTEM AND METHOD OF ADJUSTING VIEWING ANGLE FOR DISPLAY BASED ON VIEWER POSITIONS AND LIGHTING CONDITIONS

(75) Inventors: Robert D. Blatchley, Longmont, CO (US); Jurij M. Deputat, Longmont, CO (US); Donald P. Taylor, III, Longmont, CO (US); Stephen E. Zimmerman, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/969,444

(22) Filed: Jan. 4, 2008

(65) Prior Publication Data

US 2009/0174658 A1 Jul. 9, 2009

(51) Int. Cl.
*H04N 5/64* (2006.01)
*G06K 9/00* (2006.01)
*H04H 60/56* (2008.01)

(52) U.S. Cl. ........... 348/836; 345/158; 725/12; 382/103

(58) Field of Classification Search .................. 345/158; 348/836; 382/103; 725/12
See application file for complete search history.

(56) References Cited

U.S. PATENT DOCUMENTS

| 5,418,595 | A | | 5/1995 | Iwasaki et al. | |
|---|---|---|---|---|---|
| 5,805,201 | A | | 9/1998 | Fujiwara | |
| 6,131,874 | A | * | 10/2000 | Vance et al. | 248/550 |
| 6,191,773 | B1 | | 2/2001 | Maruno et al. | |
| 6,348,928 | B1 | * | 2/2002 | Jeong | 345/649 |
| 6,501,515 | B1 | | 12/2002 | Iwamura | |
| 6,633,286 | B1 | * | 10/2003 | Do et al. | 345/205 |
| 6,633,346 | B1 | | 10/2003 | Yamamoto | |
| 6,931,596 | B2 | * | 8/2005 | Gutta et al. | 715/728 |
| 7,023,499 | B2 | * | 4/2006 | Williams et al. | 348/836 |
| 7,024,683 | B1 | * | 4/2006 | Gee, Jr. | 725/132 |
| 7,151,967 | B2 | * | 12/2006 | Chen et al. | 700/56 |
| 2002/0053635 | A1 | * | 5/2002 | Schroter et al. | 250/203.1 |
| 2004/0227741 | A1 | * | 11/2004 | Koda et al. | 345/183 |
| 2005/0253538 | A1 | * | 11/2005 | Shah et al. | 315/362 |
| 2005/0273291 | A1 | * | 12/2005 | Zukowski et al. | 702/127 |
| 2006/0006999 | A1 | * | 1/2006 | Walczyk et al. | 340/539.27 |
| 2006/0071135 | A1 | * | 4/2006 | Trovato | 248/289.11 |
| 2007/0012869 | A1 | * | 1/2007 | Mullin et al. | 250/214 R |
| 2007/0180129 | A1 | * | 8/2007 | Tolmie et al. | 709/230 |
| 2007/0247717 | A1 | * | 10/2007 | Konno et al. | 359/613 |
| 2007/0252919 | A1 | * | 11/2007 | McGreevy | 348/825 |
| 2009/0025022 | A1 | | 1/2009 | Blatchley et al. | |

OTHER PUBLICATIONS

Non-Final office action dated Nov. 16, 2010 for U.S. Appl. No. 11/780,409.

* cited by examiner

*Primary Examiner* — Bipin Shalwala
*Assistant Examiner* — Jonathan King
(74) *Attorney, Agent, or Firm* — Arthur J. Samodovitz

(57) ABSTRACT

A method for adjusting a viewing angle of a display, includes determining a location of one or more viewers and determining lighting conditions. Additionally, the method includes calculating an optimal viewing position of the display based on the location of the one or more viewers and the lighting conditions and adjusting the display based on the optimal viewing position.

18 Claims, 23 Drawing Sheets

SYSTEM AND METHOD OF ADJUSTING VIEWING ANGLE FOR DISPLAY BASED ON VIEWER POSITIONS AND LIGHTING CONDITIONS

FIELD OF THE INVENTION

The invention generally relates to a system and method of adjusting a display and, more particularly, to a system and method of automatically adjusting a viewing angle of a display based on detected viewer positions and detected lighting conditions.

BACKGROUND OF THE INVENTION

Televisions and other displays and monitors are either wall mounted or placed on a support of some type. The televisions and other displays and monitors are stationary and located in a central location in an attempt to provide viewers with an optimal view of the picture. Newer technology has provided viewers with flat screen televisions, including, for example, flat screen CRTs, rear projection televisions, LCD televisions, and plasma televisions, etc. However, flat panel screens are more susceptible to glare, which obstructs and distorts viewing quality.

It is also known that advertisements are not always effectively positioned to ensure that a maximum viewing time is provided to the consuming public. Again, this is due to the fact that the advertisements are static and located in a stationary position. This can effectively decrease the effectiveness of the advertisement, as viewers may not have a proper viewing angle to read the advertisement or appreciate the subtleties of the advertisements.

Accordingly, there exists a need in the art to overcome the deficiencies and limitations described hereinabove.

SUMMARY OF THE INVENTION

In a first aspect of the invention, a method is provided for adjusting a viewing angle of a display. The method comprises determining a location of one or more viewers and determining lighting conditions. Additionally, the method comprises calculating an optimal viewing position of the display based on the location of the one or more viewers and the lighting conditions and adjusting the display based on the optimal viewing position.

In another aspect of the invention, a method for deploying an application for adjusting a viewing angle of a display is provided. The method comprises providing a computer infrastructure being operable to receive a viewer detection signal indicative of a location of one or more viewers and receive a light detection signal indicative of a location and an intensity of one or more sources of light. Additionally, the computer infrastructure is operable to adjust a position of the display based on the viewer detection signal and the light detection signal.

In still another aspect of the invention, a computer program product comprises a computer usable medium having readable program code embodied in the medium. The computer program product includes at least one component to determine a location of one or more viewers based on one or more viewer sensors and determine a location and an intensity of one or more sources of light based on one or more light sensors. Furthermore, the at least one component is configured to adjust a position of a display based on an average viewing location of the one or more viewers and the location and the intensity of the one or more sources of light.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method of adjusting a display and, more particularly, to a system and method of automatically adjusting a viewing angle of a display based on detected viewer positions and detected lighting conditions. By implementing the system and method of the invention, it is now possible to ensure that a viewer or a plurality of viewers has an optimal view of the display, regardless of the viewers' viewing locations with respect to the display and the current lighting conditions.

In embodiments, different technologies such as, for example, photodetectors, photocells, photodiodes, phototransistors, charge-couple devices (CCDs), image sensors, and/or thin-film transistors (TFTs), can be implemented to determine lighting conditions, and more specifically, the angle of incidence of light upon the display. In accordance herewith, the viewing angle of a display for a single user or a plurality of users can be adjusted based on the detection of the lighting conditions. Also, as discussed herein, the system and method of the invention is fully configurable. In implementation, the display may be a television monitor, computer monitor, static images such as advertisements, digital picture frames, cash register displays, etc.

In embodiments, different technologies such as, for example, facial recognition technology, facial detection technology, RFID (Radio Frequency Identification) technology, pressure sensors, heat sensors, motion detector and/or distance detectors, and/or manual selection via use of switches or buttons can be implemented to determine the relative position of viewers within a viewing distance. In accordance herewith, the viewing angle of a display for a single user or a plurality of users can be adjusted based on the detection of the viewer or plurality of viewers.

The method and system of the invention can preferably be implemented to maximize or increase viewing time of advertisements by the consuming public, e.g., that the advertisement is optimally seen (e.g., without glare) for the longest possible time by a consumer. As such, in one implementation, the display is an advertisement in a retailing environment, which can be in the form of a monitor, e.g., television or computer, or a static image, amongst other types of displays. The advertisement may be implemented in any retail environment such as a window display, a shopping mall, a standalone display within the store to advertise certain merchandise within the locality of the display, amongst other locations. Of course, it should be appreciated by those of skill in the art that the above environments are provided herein as illustrative examples and should not be considered a limiting feature of the invention.

System Environment

Figure 1:
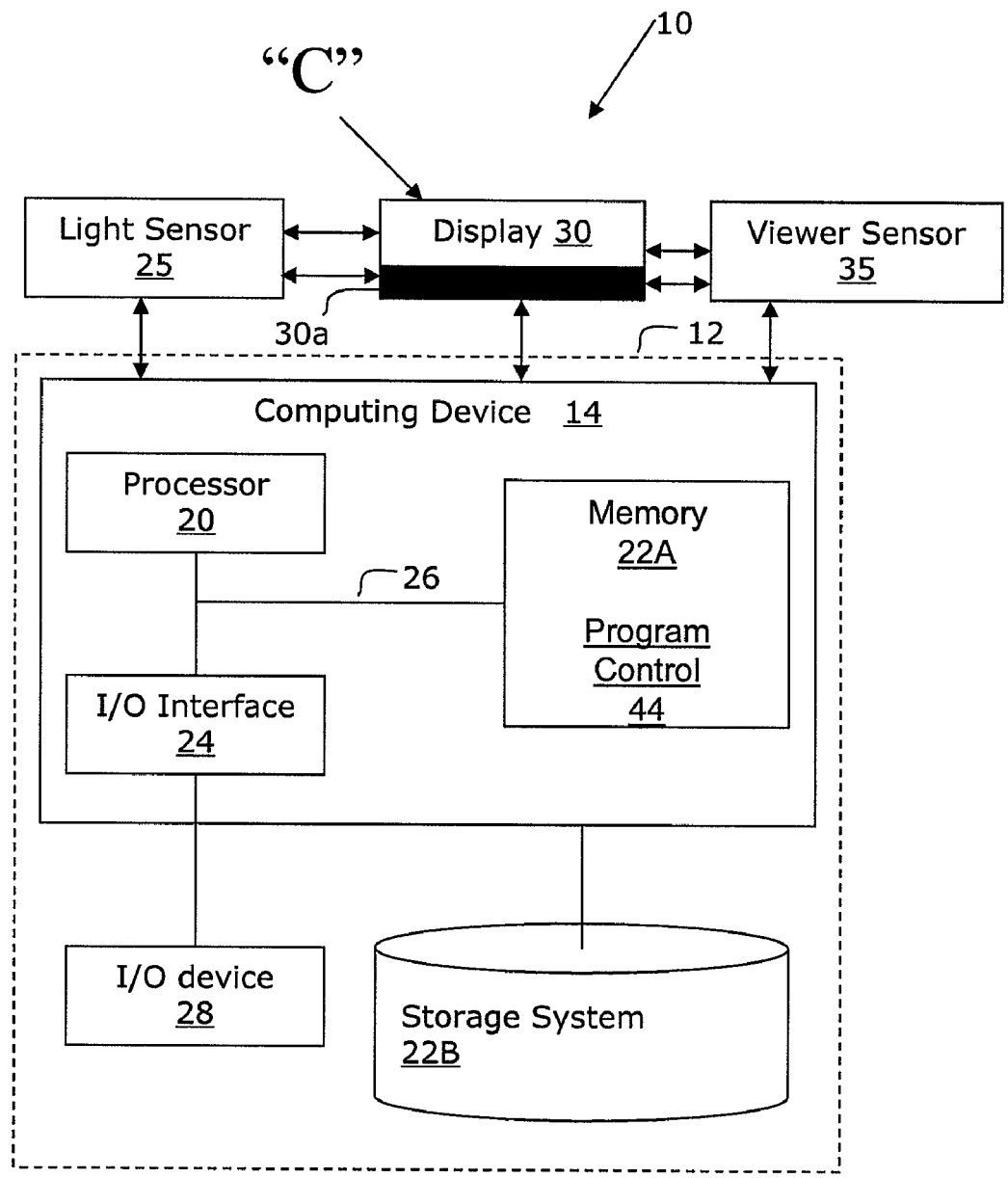
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that is operable to adjust the viewing angle of a display based on the current lighting conditions and the location of the viewers. (Hereinafter the term "display" will be used generically to include any type of display, monitor, screen, image, advertisement, picture, etc.)

More specifically, the computing device 14 is operable to receive a signal from a light sensor 25, which is configured to sense the direction and intensity of light incident on the display 30, and a viewer sensor 35, which is configured to sense the location of one or more viewers within the viewing range of a display 30. The light sensor 25 may be, for example, a photodetector or photodetector array, a photocell or photocell array, a photodiode or photodiode array, a phototransistor or phototransistor array, a charge-couple device (CCD) or CCD array, an image sensor, thin-film transistors (TFTs), a transparent film attached to the viewing display, e.g., a light sensor embedded in the glass of an LCD, a single fixed light detector, or a transparent detector that attaches to a frame of the viewing display, amongst other sensors. The viewer sensor 35 may be, for example, a facial recognition sensor, facial detection sensor, an RFID receiver used in conjunction with an RFID worn by a user, a motion detector, a distance measuring device (e.g., photodiode sensor), heat sensor and/or pressure sensor, all of which are known to those of skill in the art. The light sensor 25 and the viewer sensor 35 may be connected to the computing device 14, display 30 and/or mount or stand 30a, via a wire or wireless connection, as discussed in detail below.

The computing device 14 is also operable to receive a signal from a manual selection of switches or buttons, placed near the viewer. In this latter embodiment, the system will recognize the location of the switch or button, which has been depressed or activated by the user. In embodiments, the viewer can override the automatic adjustment or manually adjust the display via a control "C", e.g., a remote control. For example, a viewer may manually adjust the viewing position of the display 30. Moreover, the system may be user-configurable, such that the viewer may manually adjust the viewing position of the display 30 in user-configurable angular increments, e.g., five degrees.

Although the viewing angle may be a default-viewing angle, depending on any of the below variables, in preferred embodiments, the computing device 14 will use the received signals from the light sensor 25 and the viewer sensor 35 to determine an optimal viewing angle of the display 30, based on, amongst other variables as discussed herein:
  (i) the angle of incidence of current lighting conditions;
  (ii) the intensity of current lighting conditions;
  (iii) the wavelength of the current lighting conditions;
  (iv) the location of the viewer(s);
  (v) the height of the viewer(s);
  (vi) the number of viewers within viewing distance of the display;
  (vii) whether the viewer(s) is moving or substantially stationary;
  (viii) the distance of any viewer movement;
  (ix) whether the viewer(s) has left the viewing area; and/or
  (x) a predetermined time period.

The computing device 14, once it has determined the optimal viewing angle, will provide a signal to the stand or mount 30a, which supports and/or houses the display 30. In response to the signal, the stand or mount 30a will automatically adjust in order to move the display to the optimal viewing angle. The stand or mount 30a may be, for example, a cantilever arm structured and configured to move in three-dimensional space. For example, using servo-motors, gear systems, etc., all known in the art and as such needs no further explanation herein, the cantilever arm can rotate, tilt and move horizontally (telescoping feature), as well as be mounted on a rail to move vertically (or horizontally) with respect to the viewer(s).

In further implementations, the computing device 14 may be activated upon detection of a light source or by the motion of a viewer within a viewing distance of the display. Alternatively, a viewer may activate the computing device 14 upon manual selection. In still further alternative embodiments, the computing device 14 may be activated automatically when the display is turned on. The power for the mount or stand 30a may be provided by an on/off switch on the mount or stand 30a, as well as by a remote control. In embodiments, the remote control can learn the display's on/off signal so that when the display 30 is turned on, the mount or stand 30a is also activated.

Moreover, the power input from the display 30 can be provided to the mount or stand 30a such that the mount or stand 30a knows when the display is turned on. It is also contemplated that the computing device 14 may be activated and deactivated by, for example, a timer (e.g., turn on at 8:00 AM and shut down at 5:00 PM) or remain activated indefinitely (e.g., 24 hours a day) with or without a sleep mode. A motion activated or light activated sensor can also be used to activate the mount or stand 30a. In any event, the system and method of the invention is configurable based on any combination of the variables described herein.

In further embodiments, the mount or stand 30a is fully configurable; that is, the user can set when and how the mount moves. The configuration can be set and/or viewed via:
  (i) Onscreen inputs (e.g., the mount or stand 30a has input to the TV);
  (ii) An integrated display on the mount or stand 30a;
  (iii) Buttons/switch controls on the mount or stand 30a; and
  (iv) Remote input devices including, amongst others, remote control (infrared (ir) or radio frequency (rf)); wireless keyboard/mouse (ir or rf) that is accepted by a sensor on the mount or stand 30a; voice activated; button/switch controls on the mount or stand 30a; and/or button/switch controls at seating or viewing locations.

In embodiments, the mount or stand 30a can be configured to one of many different default settings. For example, the default settings may include the following default positions pre-configured or set by the user, amongst others:
  (i) Default position when there is no detected light source;
  (ii) Default position when there is light detected beneath a threshold;
  (iii) Default position for a particular time of day and day of year;
  (iv) Default position when there are no viewers within a viewing distance of the display;

(v) Default position when more than a specified number of people are in viewable range;
(vi) Default position when in "off" status; and
(vii) Default position for a specific viewer (as detected by an input such as by the facial recognition system).

In additional embodiments, the mount or stand 30a can have specific user settings, any of which is configurable via software controls and executable by executable program code, as discussed herein. Thus, as the viewer is detected, e.g., via the facial recognition or RFID usage, the computing device 14 can adjust the mount or stand 30a automatically for that viewer. The specific user settings described below may be implemented with at least one of the viewer sensors 35 (to detect the required information, e.g., a motion detector to detect movement of a viewer, etc.), as should be recognized by those of skill in the art. For example, the specific user settings may include, amongst others:

(i) How the reflected glare should be managed, e.g., directed between viewers or outside of viewers, between viewers only, or outside of viewers only;
(ii) Adjustments for certain light types and/or wavelengths, e.g., Sunlight (≈550 nm) versus fluorescent light (ι450 nm-550 nm);
(iii) Whether the display includes glare correction in the horizontal plane, the vertical plane, or both the horizontal and vertical planes;
(iv) An amount (distance) needed to change viewing angle for the particular detected viewer;
(v) How long after movement the angle should change, e.g., one minute;
(vi) A defined viewable range and angle, e.g., in a large room, 25 feet away may be considered in the viewable range;
(vii) Maximum number of people to be considered for angle adjustment, e.g., five viewers maximum;
(viii) Search for static viewers only;
(ix) Adjust for everyone walking by in viewable range up to a predetermined amount of potential viewers, e.g., 10 viewers;
(x) The largest group of static viewers or angle between any number of groups of static viewers;
(xi) The amount of movement allowed to be considered a static viewer;
(xii) The position of the static person(s), e.g., the static person(s) needs to be facing in the general direction of the display (using facial detection to actually see faces as opposed to bodies);
(xiii) How fast should the angle of the display change (actual speed of the motor used on the mount or stand 30a);
(xiv) How the mount or stand 30a should turn on/off (e.g., motion, light, remote, switch, any combination thereof, etc.);
(xv) Different default settings that are automatically configured from the factory for (home use, store use, type of advertisements (monitor, banner, etc.));
(xvi) How often to detect viewers (constant, every 10 seconds, every minute, only if someone leaves the room, a predetermined amount of motion); and
(xvii) The ability to exclude certain people (for instance infants/toddlers, pets, etc. by adjusting the sensors above a certain height. For example, the heat sensors can detect the size or shape of the individual heat signature; whereas, the facial detection can detect facial characteristics to determine approximate age. Also, the facial recognition can be used to determine the identity of the viewer.

The computing device 14 includes a processor 20, a memory 22A, an input/output (I/O) interface 24, and a bus 26. Further, the computing device 14 is in communication with an external I/O device/resource 28 and a storage system 22B. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The processor 20 executes computer program code (program control 44), which is stored in memory 22A and/or storage system 22B. While executing computer program code, the processor 20 can read and/or write data to/from memory 22A, storage system 22B, and/or I/O interface 24. The computer program code includes the processes of the invention as discussed herein.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the process described herein. Further, while performing the processes described herein, one or more computing devices in the computer infrastructure 12 can communicate with the display 30, mount or stand 30a, light sensor 25, viewer sensor 35 and/or one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and support the infrastructure such as that described in FIG. 1. The service provider, such as a Solution Integrator, advertiser, etc., could offer to perform the processes described herein for payment from the customer(s) under a subscription and/or fee agreement and/or the service provider can receive payment from the sale of advertising content to one or more third parties.

Light Detection

As described above, one or more light sensors 25 may be used to detect an intensity and direction of a source of light incident on the display 30. When light beams encounter obstacles such as mirrors, lenses or prisms whose lateral size is much greater than the wavelength of light, geometrical optics apply. The human eye has a sensitivity to light typically with wavelengths between 400 nm to 700 nm. The Sun produces sunlight having a wavelength of about 550 nm. While, the Sun is a point source, at the distance from Sun to, e.g., a window in a house, the source is no longer a point, but a wave. This is also true for internal light sources assuming the distance from the source is much greater than the wavelength of light. Thus, with the present invention, where the lateral size of a monitor or display is usually at least 14 inches (which is much larger than 550 nm), geometric optics apply, which allows waves of light to be represent as rays, where the rays are perpendicular to the incident wave.

Thus, when a light ray (or beam) from a source of light, e.g., an interior light, sunlight or, an exterior light, is incident on (or strikes) a display 30, the light beam will produce a glare upon the display 30. This glare may obstruct and distort the viewing quality for one or more viewers of the display 30. However, the produced glare may only be visible to viewers that are positioned in the path (or near to the path) of the reflected light beam, or along the angle of reflection. Moreover, the light beam will reflect off of the display 30 at an angle of reflection equal to the angle of incidence of the light beam on the display 30. Additionally, the angle of incidence determines the energy associated with the reflected ray. For example, a lower angle of incidence results in a lower energy of the reflected wave, and therefore less reflected glare. Conversely, a larger angle of incidence results in a higher energy of the reflected wave.

Thus, according to the invention, to determine the angle of reflection of the light beam, the light sensor 35 may detect the angle of incidence of the light beam upon the display 30. By detecting the angle of incidence upon the display 30, the computing device 14 can determine the current position of the light source relative to the display 30. By knowing the position of the light source, the computing device 14 is able to determine where a glare will be reflected based on the position of the display 30.

Figure 2A:
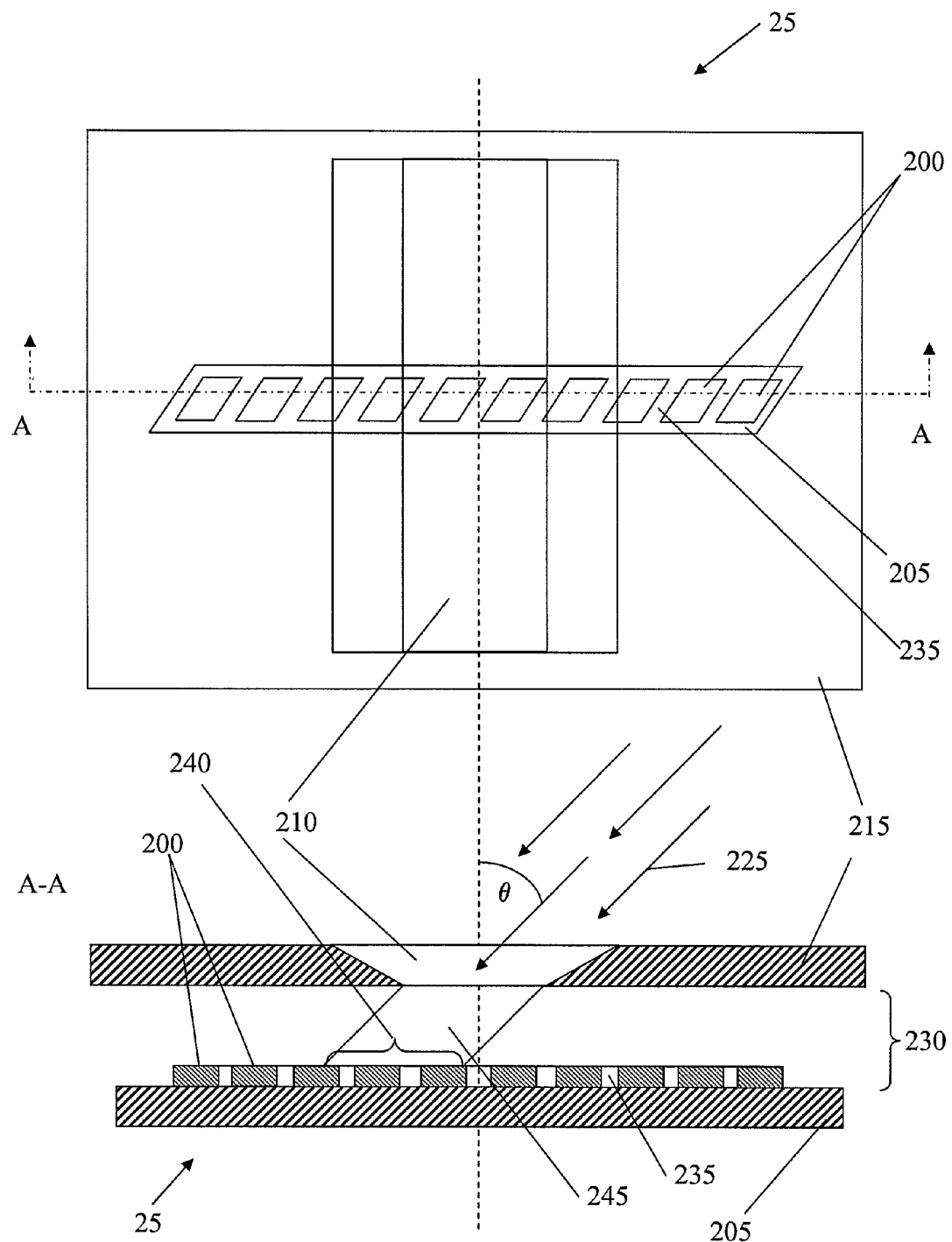
FIGS. 2A-2D show exemplary embodiments of a light sensor in accordance with the invention.

FIG. 2A shows an exemplary embodiment of a light sensor 25 for determining the angle of incidence of light. As shown in FIG. 2A, in embodiments, the light sensor 25 may comprise a photodiode array 205 having a substantially linear expanse and a shutter plate 215. Shutter plate 215 may be mounted above the photodiode sensor array 205 and have a slot 210 for illuminating the sensor array 205 with or by a band of light 245. The slot 210 permits a substantially parallel band of light 245 to pass through, in order to determine the angle of incidence θ of the light. The slot 210 may be arranged in an orthogonal configuration in relation to a preset longitudinal direction of the sensor array 205 and cross the center of the photodiode sensor array 205, with a defined spacing 230 above the photodiode areas (light-sensitive surfaces) 200 of the photodiode sensor array 205. This spacing 230 mainly presets the maximally detectable angle of incidence of the light.

The photodiode sensor array 205 includes a plurality of congruent photodiode areas (light sensitive surfaces) 200 arranged in rows and substantially having the same length and width. The size of each photodiode area 200 is such that upon illumination by the band of light 245 in one photodiode area 200, a maximum photoelectric current having a minimum amount for the division into digital resolution stages of the desired size and number of photodiode areas is generated. The dimensions of the photodiode areas 200 are also substantial for this purpose as well. The larger dimensions may be used in order to generate photoelectric currents that have an adequate signal/noise ratio. On the other hand, in accordance with the invention, the arrangement of the photodiode array 205 and the width of the slot 210 enables the simultaneous illumination of a plurality of photodiodes areas 200. The photodiode areas 200 have portions which overlap each other in the direction of the longitudinal expanse of photodiode sensor array 205.

In this arrangement, the photodiode areas 200 are lined up in rows, and the width 240 of the band of light 245 produced by the slot 210 corresponds with the longitudinal expanse of photodiode areas 200. Bridges 235 are arranged so that with the band of light 245 being in any position, at least two neighboring photodiode areas 200 simultaneously supply a significant photoelectric current. In this way, portions of the light-sensitive photodiode areas 200 overlap one another in the longitudinal direction of the lined-up photodiode sensor array 205 in spite of light-insensitive bridges 235 that may be required for electrically insulating neighboring photodiode areas. More specifically, bridges 235 are located between photodiode areas 200. These bridges 235 may be necessary to electrically insulate photodiode areas 200 so that cross-talk or inductive disturbance is prevented to a large extent. Thus, in embodiments, at least two photodiode areas 200 may simultaneously supply a significant photoelectric current at any time due to the band of light 245.

In operation, the light 225 passing through slot 210 produces a band of light 245 illuminating the photodiode sensor array 205 transversely to the longitudinal expanse of the photodiode sensor array 205. The band of light 245 illuminates different photodiode areas 200 depending on the angle of incidence θ of light 225. The position of band of light 245 is determined by evaluating the photoelectric currents of the photodiode sensor array 205. This position is a measure of the angle of incidence θ of the light 225.

The lower portion of FIG. 2A is a sectional representation along line A-A of the top view shown at the upper portion of FIG. 2A. This section view shows shutter plate 215 arranged with a defined spacing 230 above photodiode areas 200. This spacing 230, along with the angle of incidence θ, has a substantial influence on the degree of the change occurring in the position of the band of light 245, which depends on angle of incidence θ. Thus, the spacing 230 influences the angle resolution of the arrangement. In the lower sectional drawing of FIG. 2A, slot 210 is shown in a stylized form with wedge-shaped edges whose geometric shape permits unrestricted passage of the band of light 245 and also accommodates large angles of incidence. The slot 210 may be produced by microlithographic techniques.

While the light sensor 25 has been described in the exemplary embodiment above as a photodiode sensor array, the invention contemplates other types of light sensors. Thus, the invention should not be construed as limited to the exemplary embodiment. For example, the light sensor 25 may comprise a photodetector, a photodetector array, a photocell or photocell array, a phototransistor or phototransistor array, a charge-couple device (CCD), an image sensor, a thin-film transistors (TFT), a transparent film attached to the viewing display, a single fixed light detector, or a transparent detector that attaches to a frame of the viewing display 30.

Figure 2B:
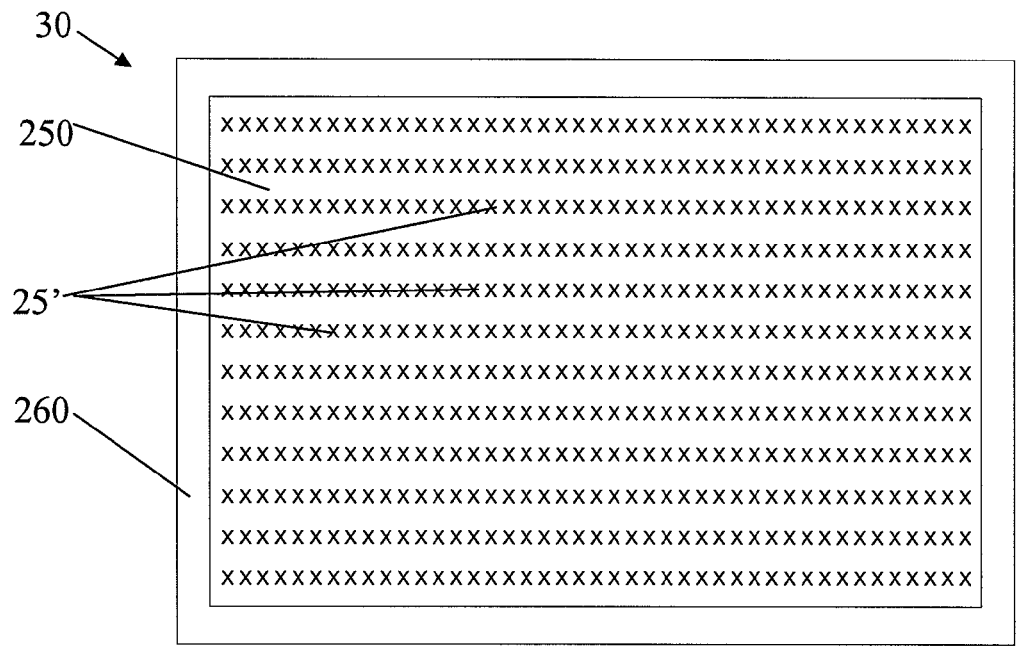

FIG. 2B shows an additional embodiment of the light sensor 25 as a transparent incident angle detector. As shown in FIG. 2B, a plurality of light sensors 25' may be formed in a transparent film attached to the viewing screen 250 of the display 30. In embodiments, the output of each sensor 25' may be compared relative to neighboring sensors to determine if a glare exists. If a glare exists and, in embodiments, if the glare exceeds a threshold, a determination may be made as to specifically where the glare exists on the display. In accordance with the determined glare location, the position of the display 30 may be adjusted, as described further below.

More specifically, the light sensors 25' may include circuitry ("sensor circuits") (not shown) located adjacent to the viewing screen 250, which accept charges from each light sensor 25 and convert those charges into signals that can be transmitted. Signals from each light sensor 25 may be in the form of, for example, an analog voltage, charge, or current, and the sensor circuits may amplify, digitize, and/or convert the signals to one of the other forms. For example, charge-coupled devices (CCDs) typically move an electric charge stored at each light sensor 25 to sensor circuits at the edge of the light receiving surface, where the charge is converted to an analog voltage.

As shown in FIG. 2B, the viewing screen 250 may include a plurality of light sensors 25'. In embodiments, the light sensor 25' may be a device that converts light to an electric charge, such as a photodiode. Moreover, a first light sensor 25' may provide an indication of the amount of light impinging on a first portion of the viewing screen 250 and a second sensor 25' may provide an indication of the amount of light impinging on a second portion of the viewing screen 250. Further, as shown in FIG. 2B, the light sensors 25' of the viewing screen 250 may be arranged as an array of light sensors 25'.

It may often be the case that many of the light sensors 25' do not detect glare. The information that might be transmitted and processed from the viewing screen 250 may therefore be reduced by combining the information from a plurality of the light sensors 25' using circuitry that performs the equivalent of a logical OR function (so-called "logic-or gates"). A logic-or gate may produce an output signal when the logic-or gate detects that input channels of any of the plurality of sensors 25' indicate glare on the viewing screen 250. Thus, in accordance with the determined glare location, the position of the display 30 may be adjusted, as described further below.

Furthermore, in embodiments, when determining whether glare exists, the threshold value for glare detection need not be the same for each of the light sensors 25'. For example, it may be desirable to have a higher threshold value for light sensors 25' in a center portion of the viewing screen 250 than for light sensors 25' near the edge of the viewing screen 250.

Figure 2C:
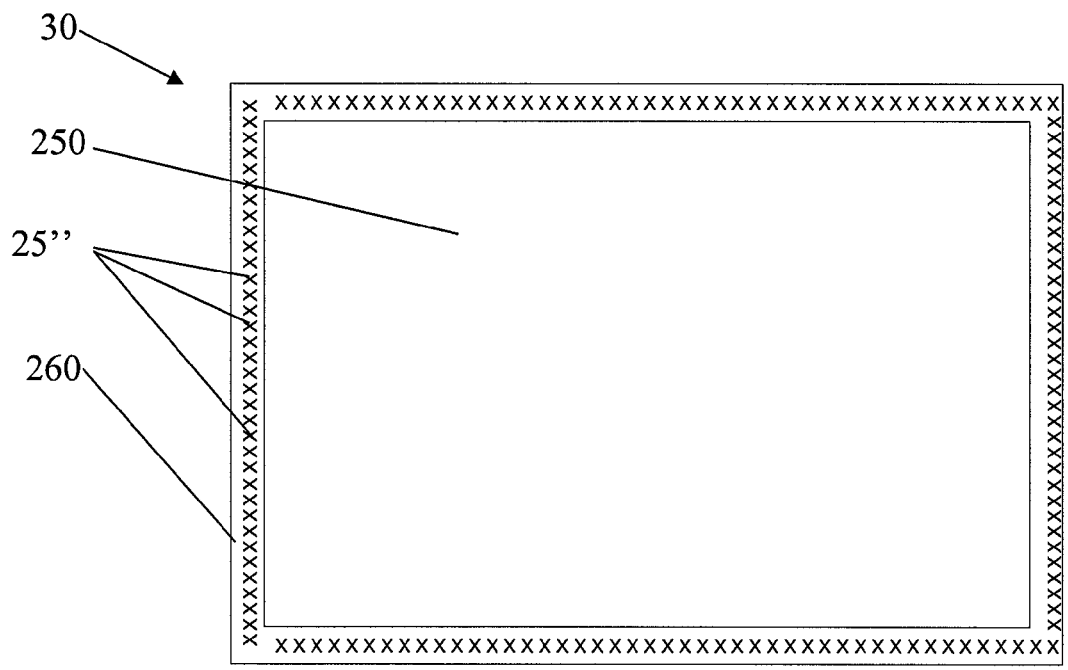

FIG. 2C shows an additional embodiment of the invention indicating a positioning of the light sensor(s) 25. As shown in FIG. 2C, a plurality of light sensors 25" may be attached to a frame 260 of the display 30.

Figure 2D:
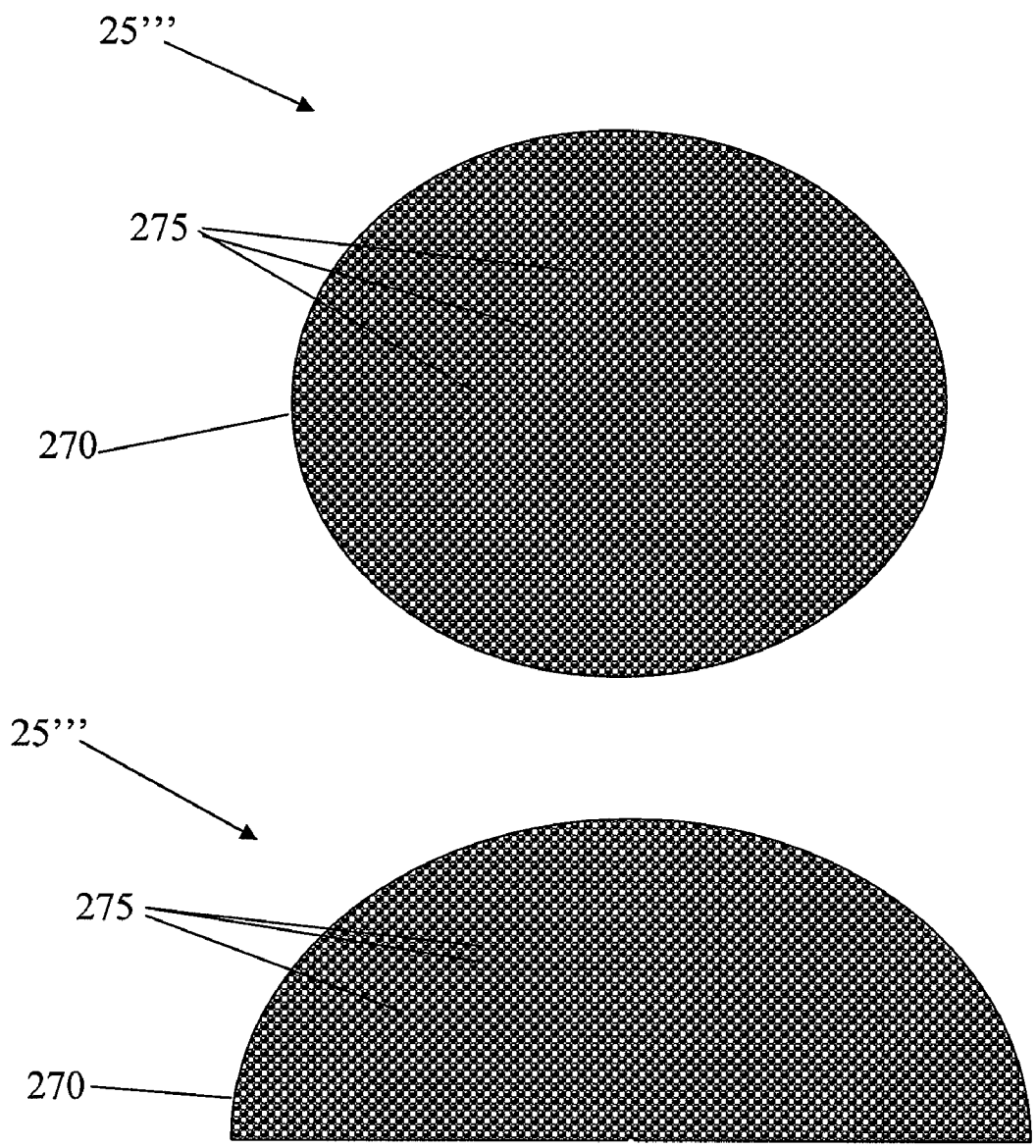

FIG. 2D shows a top and side view of an additional light sensor embodiment. As shown in FIG. 2D, for example, the light sensor 25''' may comprise a plurality of photodiodes 275 arranged on a curved surface 270 mounted on the display 30 or the display stand or mount 30a. For example, the plurality of photodiodes 275 may be arranged on a hemispherical dome 270 placed on a corner of the display 30, with each photodiode 275 arranged to detect incoming light from a slightly different angular direction. Thus, the computing device 14 may determine which of the plurality of photodiodes 275 is detecting the highest intensity of light. Knowing the relative positions of each of the photodiodes 275 on the hemispherical dome 270, the computing device 14 is then able to determine the location of the source of incident light.

In embodiments, the light sensor 25 may comprise a plurality of light sensors 25. Moreover, the plurality of, e.g., two, light sensors 25 may be arranged orthogonally to one another and along the vertical and horizontal axes of the display 30. With such an arrangement, the light sensors 25 may provide a detection of the angle of incidence relative to the vertical axis of the display 30 and an angle of incidence relative to the horizontal axis of the display 30. Having such information allows the computing device 14 to control the position the display 30 relative to the vertical and horizontal axes of the display 30, as explained further below.

Additionally, the invention contemplates that a light source may be too low to produce a disruptive glare on the display 30 even though the display 30 is positioned such that a viewer is within the angle of reflection of the light source. For example, different interior configurations and parameters (e.g., wall paint color) may affect how, or to what extent, an incident light beam is perceived as a glare. Thus, in embodiments, the light sensor 25 may detect an intensity of the light source, in addition to the angle of incidence of the light source. Accordingly, if the light sensor 25 detects a light source incident on the display 30 that is below a threshold, e.g., a predetermined threshold or a user-configurable threshold, the computing device 14 may make no adjustments to the orientation of the display 30 to account for the lighting conditions.

It should be understood that the position of the light source may, in embodiments, be static, e.g., an interior lamp, or dynamic, e.g., the Sun. That is, with a dynamic light source, the position of the light source relative to the display may vary (e.g., the Earth rotating relative to the Sun) and/or the intensity of the light source may vary (e.g., clouds obscure the sunlight). Thus, in embodiments, the computing device 14 may determine the position and/or the intensity of the light source in real-time and make adjustments to the position of the display 30, accordingly, as discussed further below.

Moreover, the invention contemplates that there may be more than one source of light incident upon a display 30 at the same time. Thus, the invention contemplates that the light sensor 25 may detect more than one source of light and the position of the display 30 may be adjusted to account for the more than one source of light, as explained further below. In other embodiments, the light sensor may detect more than one source of light, and the display position may be adjusted to account for the one source of light with the strongest intensity. For example, the light sensor 25 may detect a first light source with an intensity of five lumens and a second light source with an intensity of ten lumens. Thus, with this embodiment, the computing device 14 may determine a lighting adjustment based only on the second source which has the stronger intensity. Additionally, while the light source has been described as a light beam emanating from a light source, it should be understood that the light source need not directly impact the display to produce a glare. That is, the glare may be caused by a light source that indirectly impacts the display 30 (e.g., via a reflection of the light source off of a wall before impacting the display 30).

Viewer Detection

As described above, one or more viewer sensors 35 may be used to detect a location of one or more viewers. In embodiments, the facial detection or facial recognition may sense a position of a viewer's face; whereas, a pressure sensor may sense that a viewer is located at or near the placement of the viewer sensor 35 (e.g., the viewer is sitting on a chair with a pressure sensor embedded therein or standing on a floor with a pressure sensor embedded therein). The motion detector can detect the presence and motion of a viewer within a certain distance of the detector. In embodiments, it is also theoretically possible to configure the motion detector such that it detects a height of the viewer. In such an embodiment, the motion detector can be adjusted such that infants, pets, etc. will not affect the positioning of the display 30. The heat sensor can detect the position of the viewer and theoretically their relative size to other viewers.

Determining Optimal Display Position

Although the viewing angle of the display 30 may be a default-viewing angle, depending on any of the below variables, in preferred embodiments, the computing device 14 will use the received signals from the light sensor 25 and the viewer sensor 35 to determine an optimal viewing angle of the display 30, based on, amongst other variables as discussed herein:
  (i) the angle of incidence of current lighting conditions;
  (ii) the intensity of current lighting conditions;
  (iii) the location of the viewer(s);
  (iv) the height of the viewer(s);
  (v) the number of viewers within viewing distance of the display;
  (vi) whether the viewer(s) is moving or substantially stationary;
  (vii) the distance of any viewer movement;
  (viii) whether the viewer(s) has left the viewing area; and/or
  (ix) a predetermined time period.

The computing device 14 may determine a viewer adjustment based on the signal from the viewer sensor 35, and may determine a lighting adjustment based on the signal from the light sensor 25 and the determined viewer adjustment. That is, the computing device 14 may initially determine a viewer adjustment for the display 30 based on the detected positions of the viewers, and then determine a lighting adjustment for the display 30 based on the detected lighting conditions and the position of the display 30 that would result due to the viewer adjustment. It should be understood that the display need not be positioned in separate steps for the viewer adjustment and the lighting adjustment. Rather, the computing device 14 may determine an "ideal" position for the viewers based on their positions, without accounting for the lighting conditions, and then determine an "optimal" display position by accounting for how the current lighting conditions would affect the viewers if the display 30 were adjusted to the "ideal" position. After accounting for the current lighting conditions, the computing device 14 may cause the display 30 (or the display stand or mount 30a) to move to the "optimal" display position, as described above. Thus, the position of the display 30 may only be adjusted under a single movement after determining the viewer adjustment and the lighting adjustment.

Viewer Adjustment Determination

In an exemplary embodiment, the computing device 14 may receive a signal from the viewer sensor 35 to determine the relative position of the viewer(s). If there is a single viewer, the computing device 14, for example, determine a viewer adjustment, such that the display 30 is directed directly at the single viewer. If there is more than one viewer, the computing device 14 may, for example, determine a viewer adjustment using an average angle of the two viewers.

FIGS. 3-9 show various embodiments in accordance with aspects of the invention for determining the viewer adjustment. Again, as described above, it should be understood that, in embodiments, determining the viewer adjustment does not necessarily include moving the display 30 to the position in accordance with the viewer adjustment.

Figure 3:
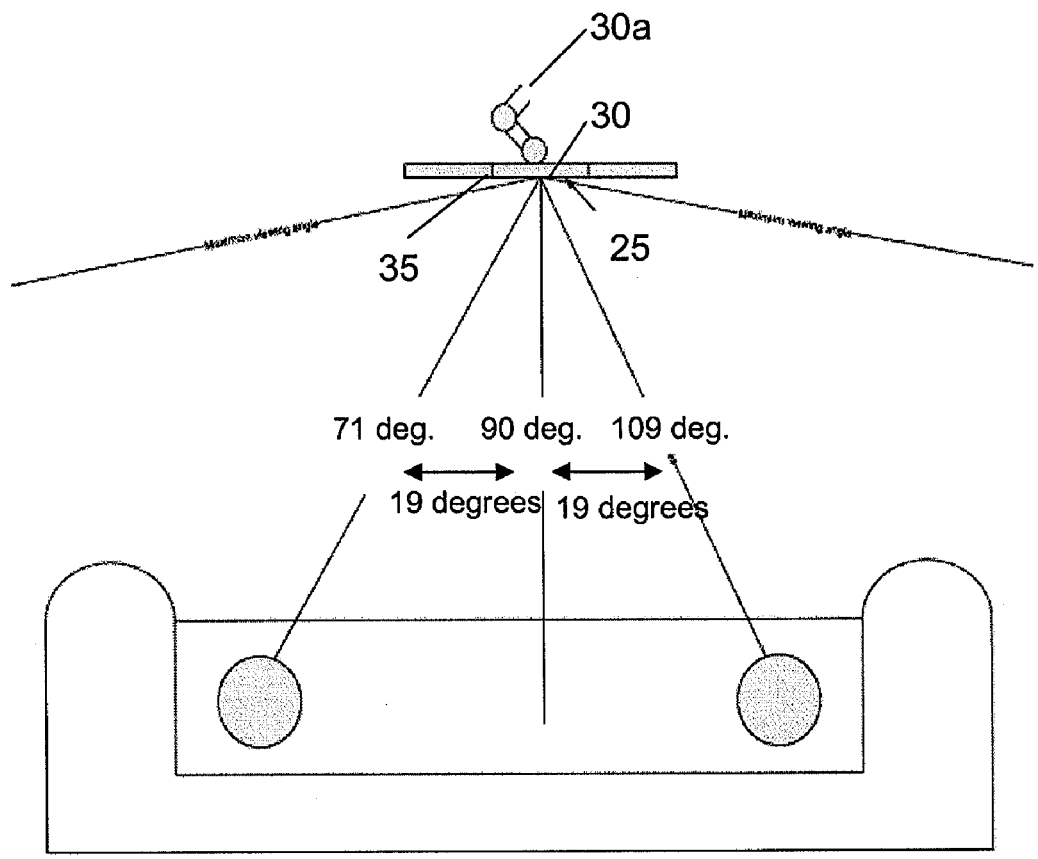
FIGS. 3-9 show various embodiments for determining a viewer adjustment in accordance with aspects of the invention.

In FIG. 3, two viewers are at an angle of 71° and 109°, respectively, from the display 30. In accordance with the invention, the computing device 14 may determine a viewer adjustment of 90° from the default angle using an average angle of the two viewers.

Figure 4:
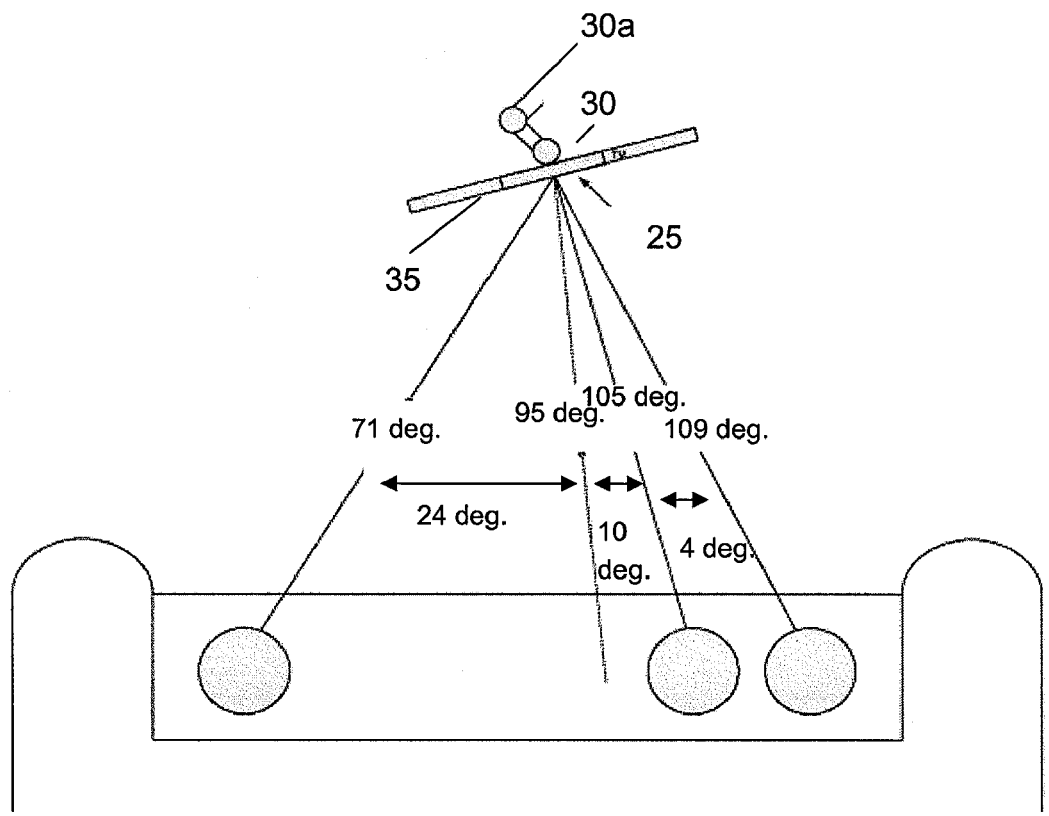

In FIG. 4, three viewers are at an angle of 71°, 105° and 109°, respectively, from the display 30. In accordance with the invention, the computing device 14 may determine a viewer adjustment of 95° from the default angle using an average angle of the three viewers. This shows a bias or weighting towards the viewers on one side.

Figure 5:
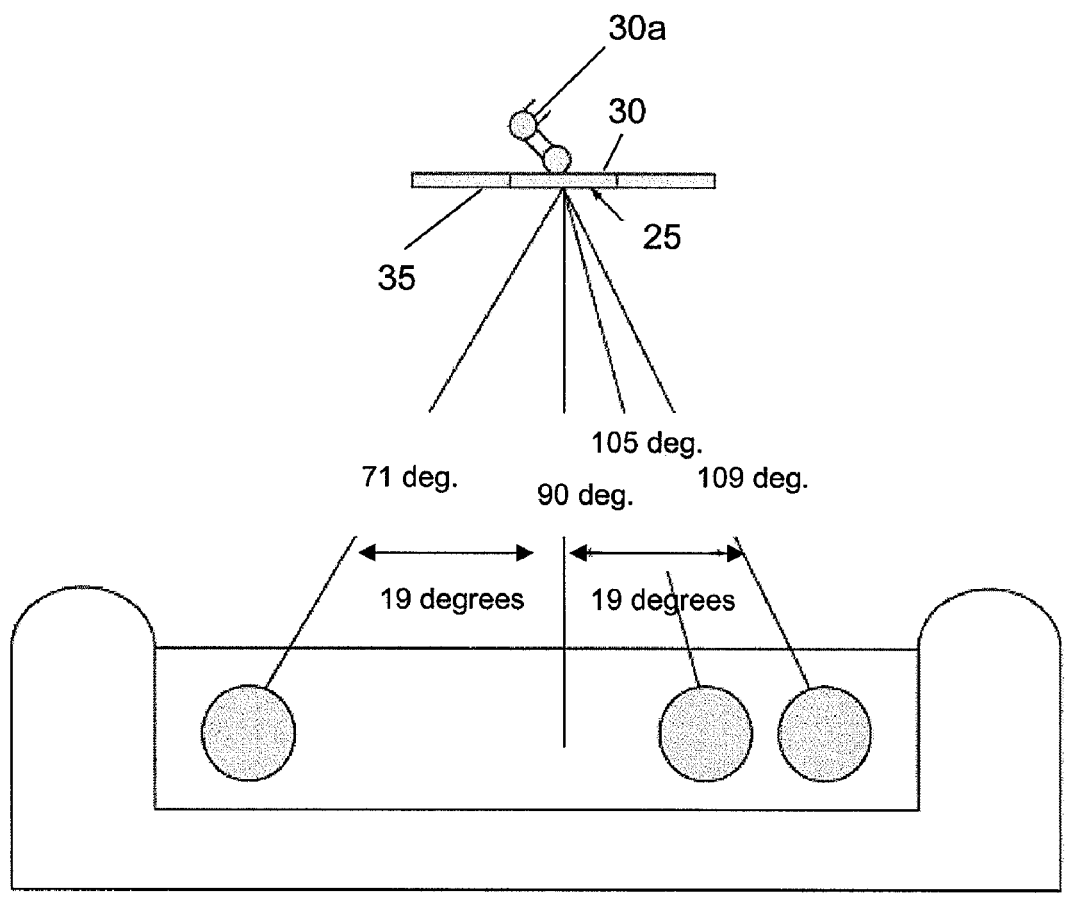

In FIG. 5, three viewers are at an angle of 71°, 105°, and 109° respectively, from the display 30. In accordance with the invention, the computing device 14 may determine a viewer adjustment of 90° from the default angle using an average angle of the two end viewers only. That is, in embodiments, only the positions of the extreme viewers (e.g., those furthest from a centerline) may be used to determine the viewer adjustment.

Figure 6:
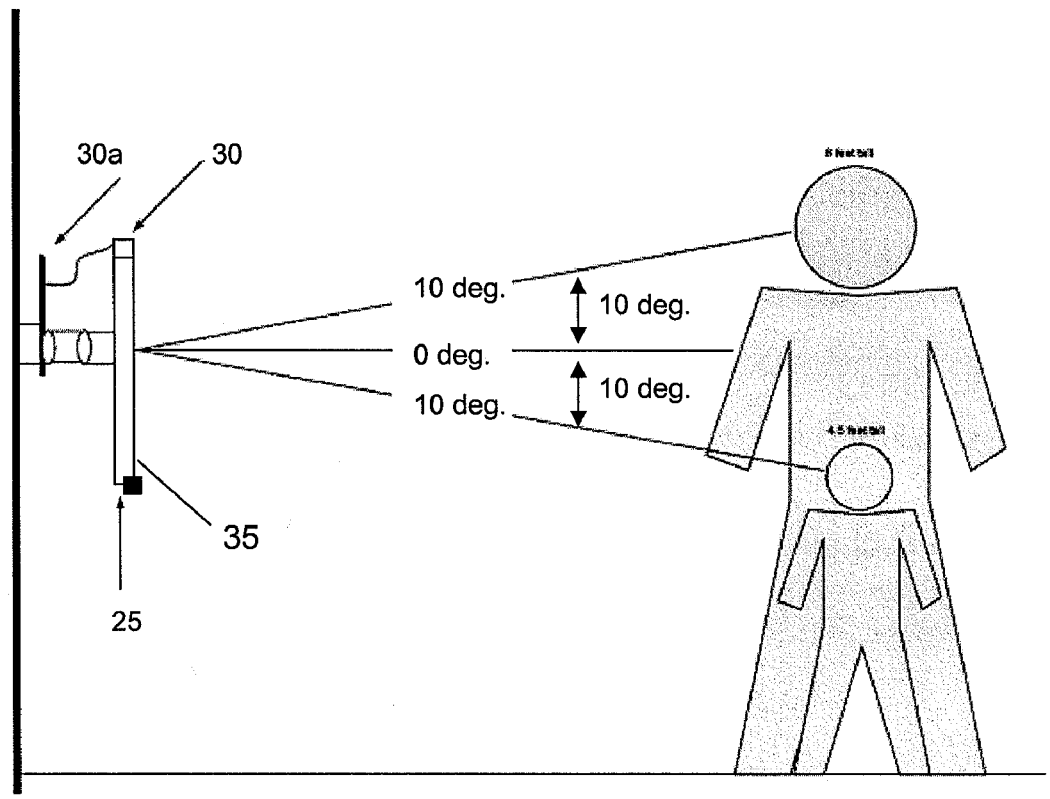

In FIG. 6, two viewers are at a different height, e.g., an angle of 10° and 10°, respectively, from the display 30. In accordance with the invention, the computing device 14 may determine a viewer adjustment tilt angle of 0° from the default angle using an average angle (height) of the two viewers.

Figure 7:
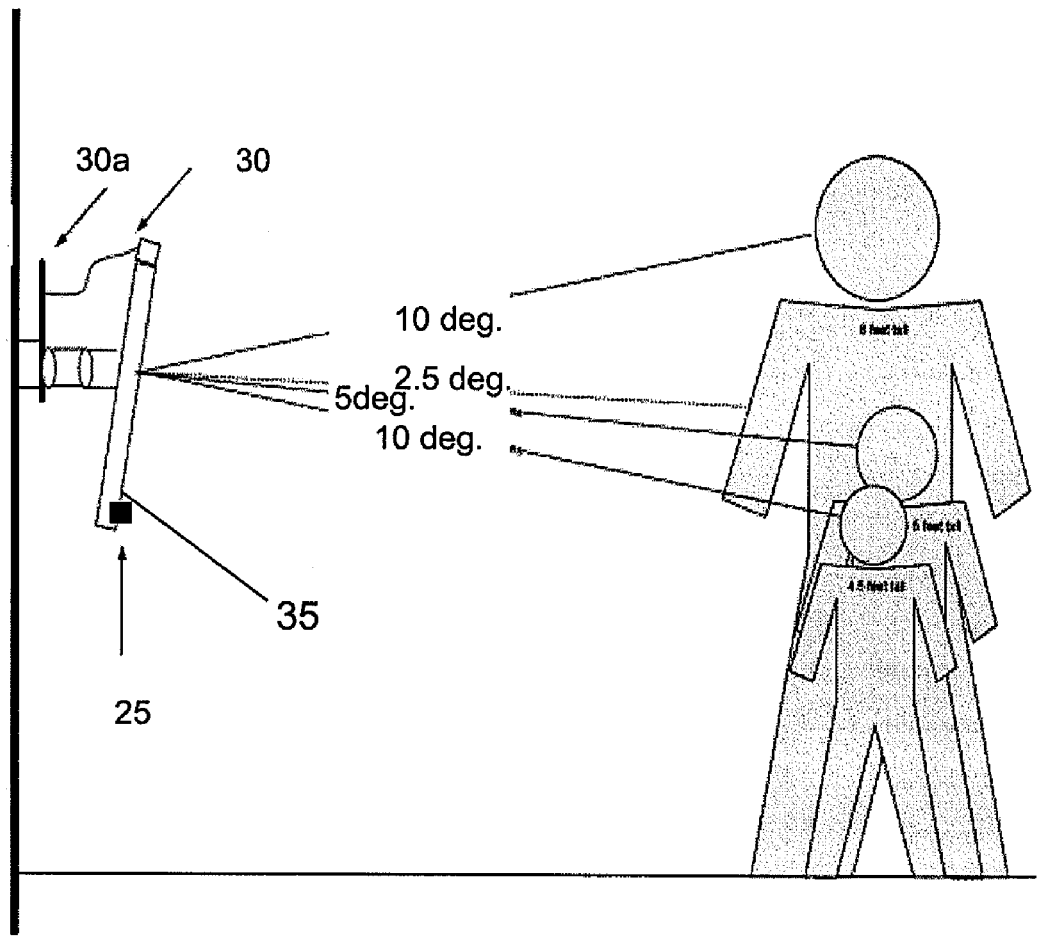

In FIG. 7, three viewers are at an angle of 10°, 5°, and 10°, respectively, from the display. In accordance with the invention, the computing device 14 may determine a viewer adjustment tilt angle of 2.5° from the default angle using an average angle (height) of the three viewers. This shows a bias or weighting based on the taller viewers.

Figure 8:
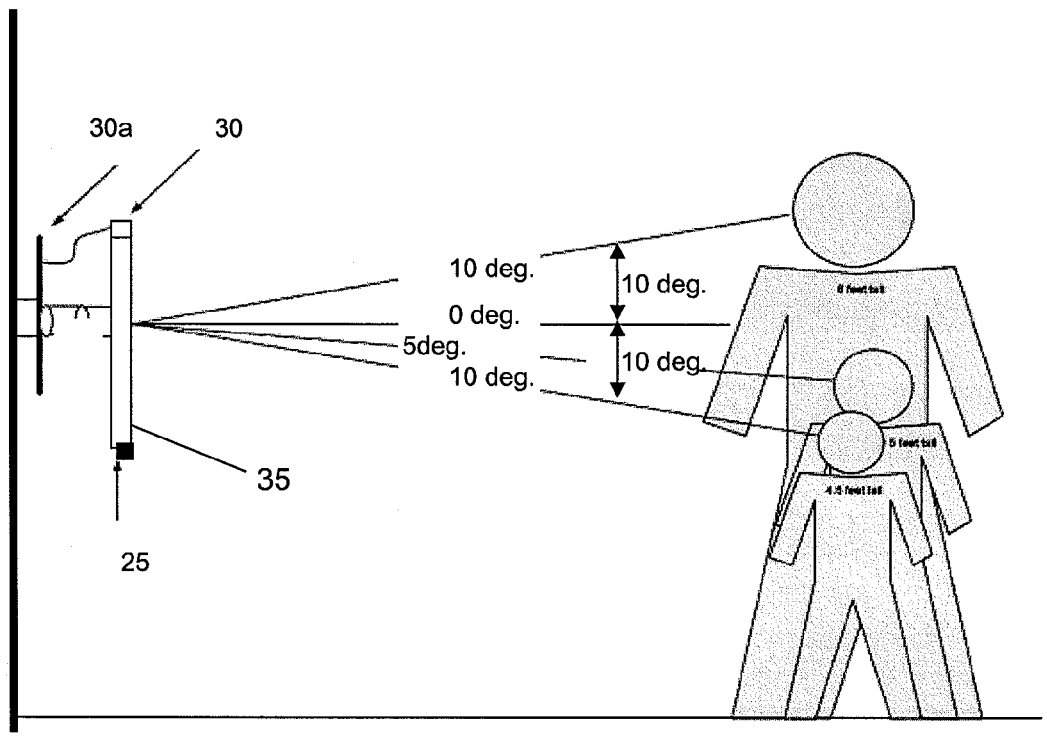

In FIG. 8, three viewers are at an angle of 10°, 5°, and 10°, respectively, from the display 30. In accordance with the invention, the computing device 14 may determine a viewer adjustment tilt angle 0° from the default angle using an average angle of the two extreme viewers (e.g., viewers of six feet and 4.5 feet).

Figure 9:
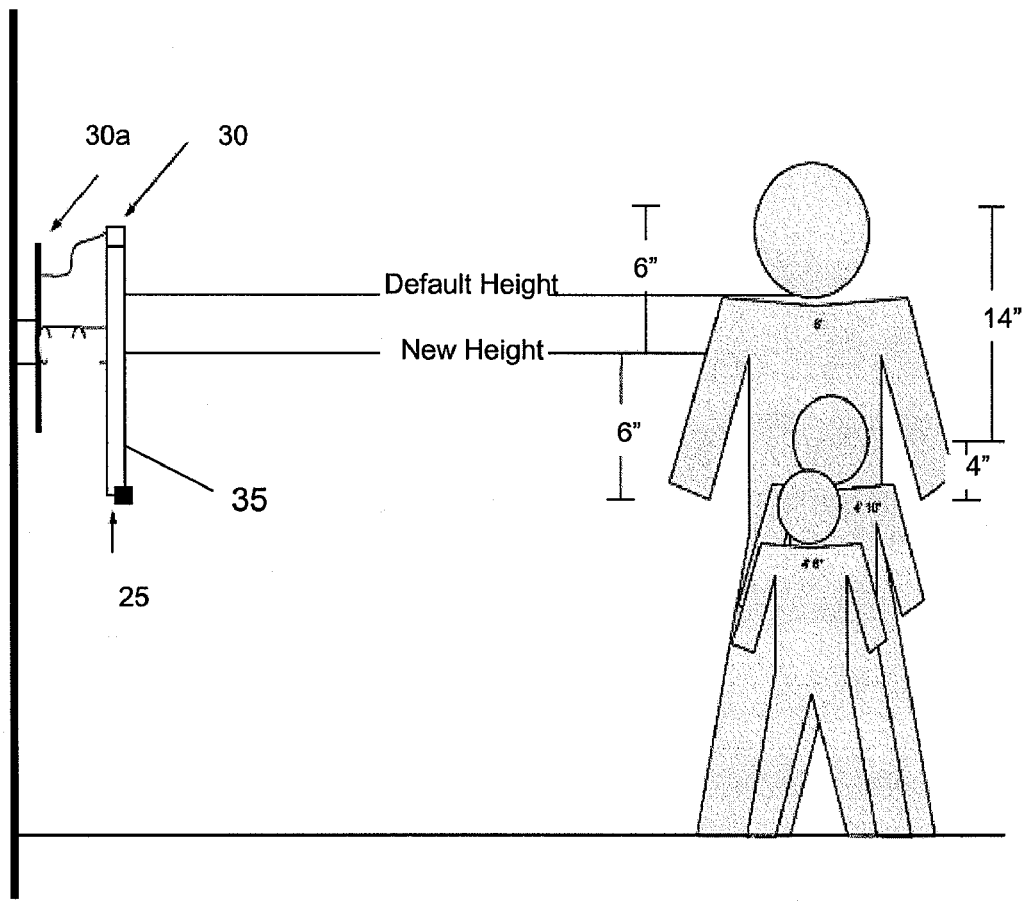

In FIG. 9, the display 30 is moved in a vertical direction e.g., up or down, based on the height of the viewers. In this example, three viewers are at different heights with respect to the display 30. In accordance with the invention, the computing device 14 may determine a viewer adjustment of a new height from a default height using an average height of the three viewers. Alternatively, in this example, the computing device 14 may determine a viewer adjustment of a new height from the default height based on an average height of the two extreme viewers (e.g., the shortest and tallest of the viewers).

Preferably, the viewer sensor 35 is a facial recognition and/or detection technology, distance measuring device, heat sensor or motion detector in the examples of FIGS. 6-9. This will allow the system of the invention to determine a height or relative height of the viewers. These same types of viewer sensors 35, in addition to the pressure sensor, can be used in remaining embodiments of the invention.

It should also be understood by those of skill in the art that the present invention is configured to determine a viewer adjustment of the display angle using any combination of techniques noted above. For example, the present invention can determine a viewer adjustment of the display angle using an averaging of both the location and height of each viewer with respect to one another and the display. Also, it should be recognized in view of the teachings discussed herein that the calculations to determine a viewer adjustment of the viewing angle may be based on facial recognition or detection, a general location of the user as detected by a pressure sensor, RFID, distance measuring device or a motion detector, to name a few.

Lighting Adjustment Determination

In addition to determining the viewer adjustment for the display 30, the computing device 14 may determine the lighting adjustment for the display 30. As described above, the computing device 14 is aware of the positions of the viewers and the source of the light, via the viewer sensor 35 and the lighting sensor 25, respectively. Once the viewer adjustment is determined, the computing device 14 may determine if the position of the display 30, when adjusted for the viewers in accordance with the viewer adjustment, will present a glare to one or more viewers. If the display 30 will present a glare to one or more viewers if positioned in accordance with the viewer adjustment, the computing device 14 may determine a "lighting adjustment," or an adjustment of the display based on the lighting conditions. If the display 30 will not present a glare to one or more viewers if positioned in accordance with the viewer adjustment, then no lighting adjustment may be necessary.

If a lighting adjustment is necessary, the computing device 14 may determine a lighting adjustment, such that a detected source of light (e.g., the Sun) does not produce a glare on the display 30 that is visible to the one or more viewers. In embodiments, the computing device 14 may determine a lighting adjustment, such that the reflected light (or glare) is directed to a space where there are no current viewers, while still maintaining the display 30 is a position, such that the viewers have a sufficient view of the display 30. Additionally, in embodiments, the computing device 14 may determine a lighting adjustment, such that the reflected light (or glare) is directed to a space where there are no current viewers within an angular range (e.g., ten degrees) of the reflected light. Of course, as the number of simultaneous viewers increases, the availability of areas to direct the reflected light decreases. As such, the invention contemplates situations in which it may not be possible to maintain the glare angular range offset for each of the viewers of, e.g., ten degrees.

Figure 10:
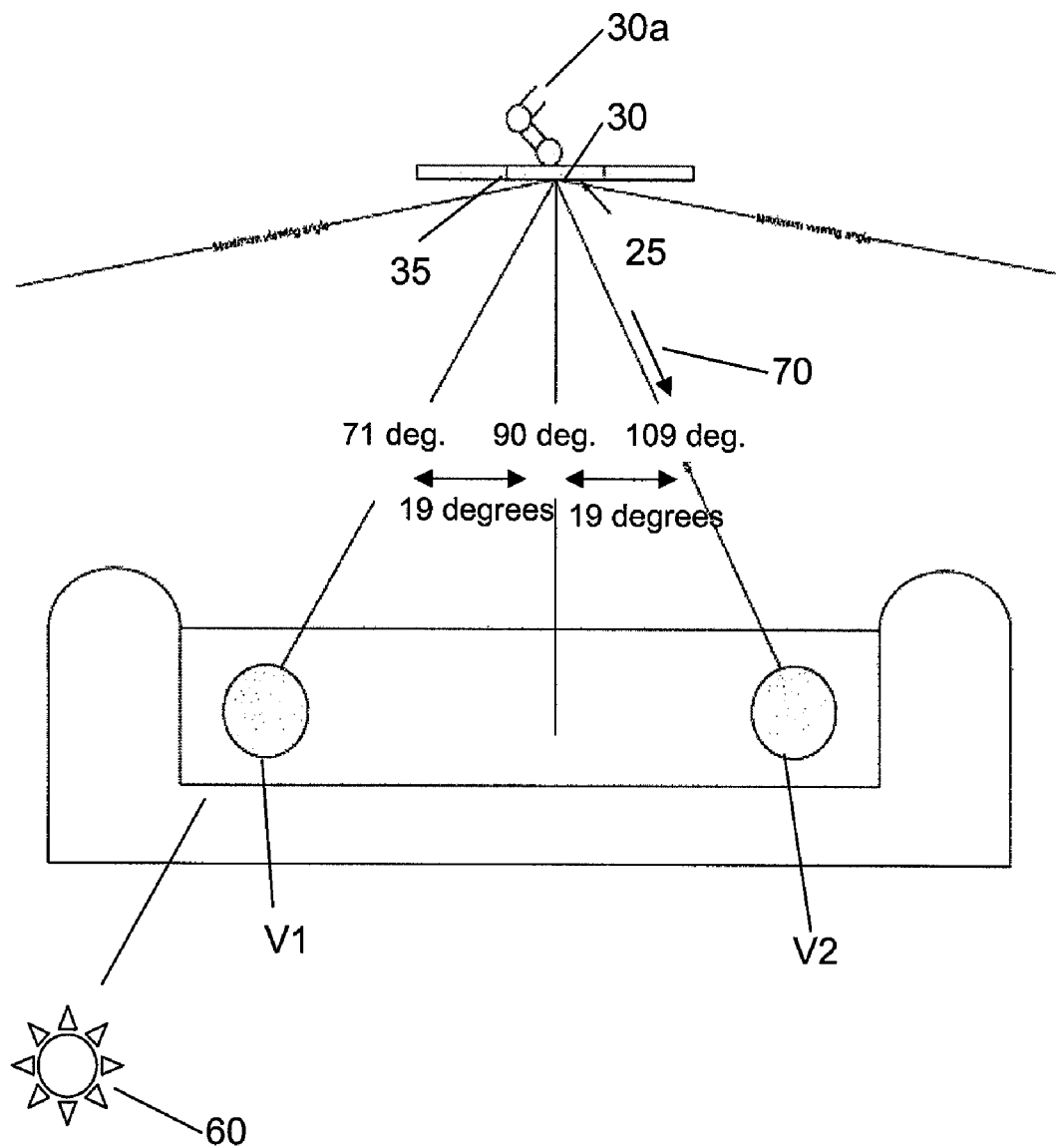
FIGS. 10-20 show various embodiments for determining a lighting adjustment in accordance with aspects of the invention.
Figure 11:
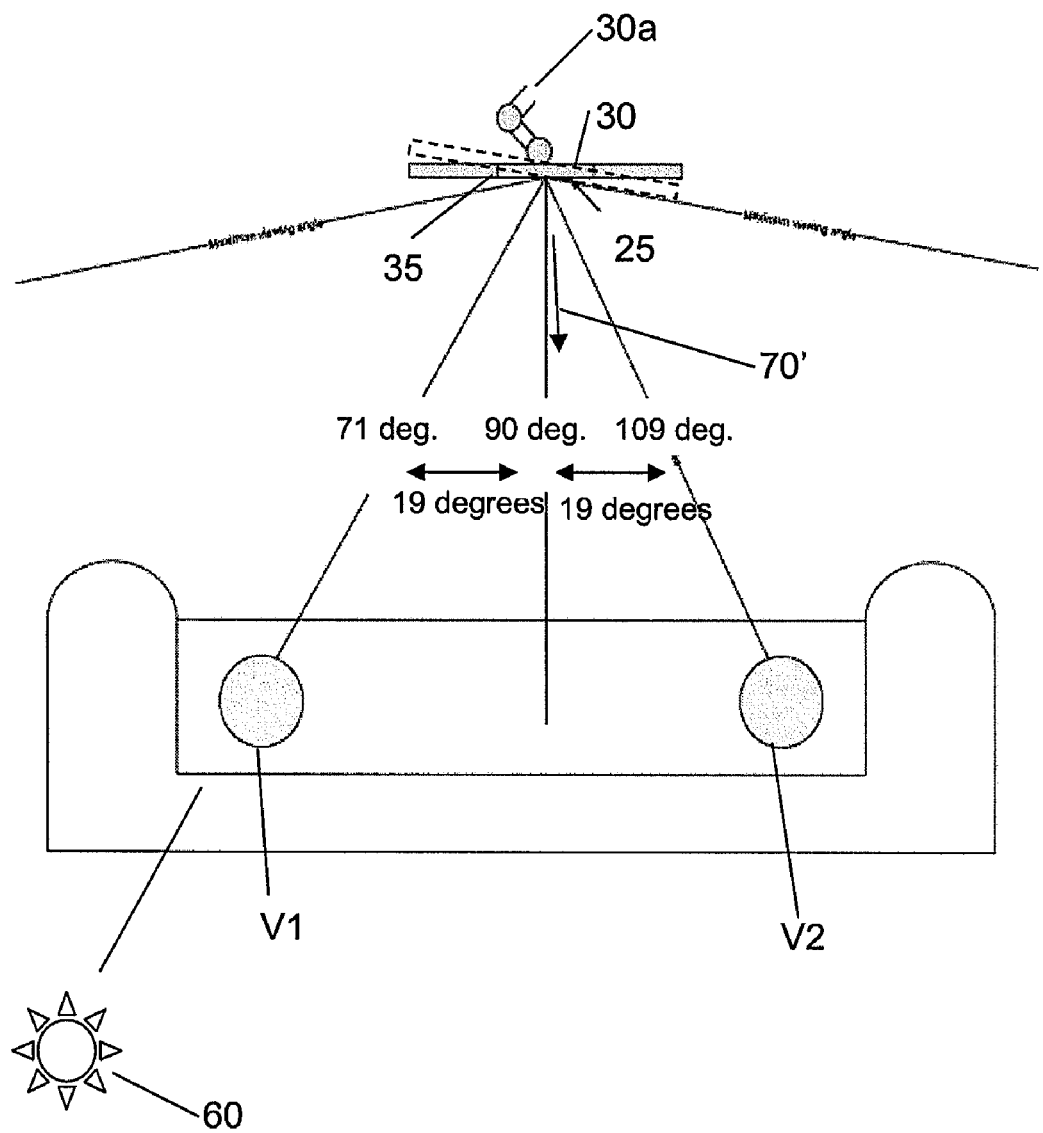

FIGS. 10-20 show various embodiments in accordance with aspects of the invention for determining the lighting adjustment. As shown in FIG. 10, a light source 60 is positioned directly behind viewer 1 (V1) offset at an angle of nineteen degrees from the normal of the display screen. Thus, as described above, the light source 60 will reflect off of the display 30 at an angle of nineteen degrees and may produce a glare on the display 30 for viewer 2 (V2) as represented by arrow 70 (depending, for example, on the intensity of the light source). According to the invention, with the example of FIG. 10, the computing device 14 may determine a lighting adjustment, such that the reflected light (or glare) 70 is directed to a viewing area that currently has no viewers. Thus, for example, the computing device 14 may determine a lighting adjustment, such that the display 30 is positioned as shown by the dashed lines in FIG. 11. With the display 30 positioned as shown by the dashed lines in FIG. 11, the light source 60 is reflected along path 70' between V1 and V2, so that neither V1 or V2 are affected by the glare. Moreover, with the display 30 positioned as shown by the dashed lines in FIG. 11, both V1 and V2 are still presented with a sufficient view of the display 30. Additionally, as shown in FIG. 11, by rotating the display clockwise, with this example, the angle of incidence is reduced. Thus, as explained above, the percentage of reflected energy is reduced (and the percentage of refracted energy is increased). Consequently, by positioning the display 30 as shown in FIG. 11, not only is the reflected glare directed away from the viewers, but the energy of the reflected glare is reduced.

Figure 12:
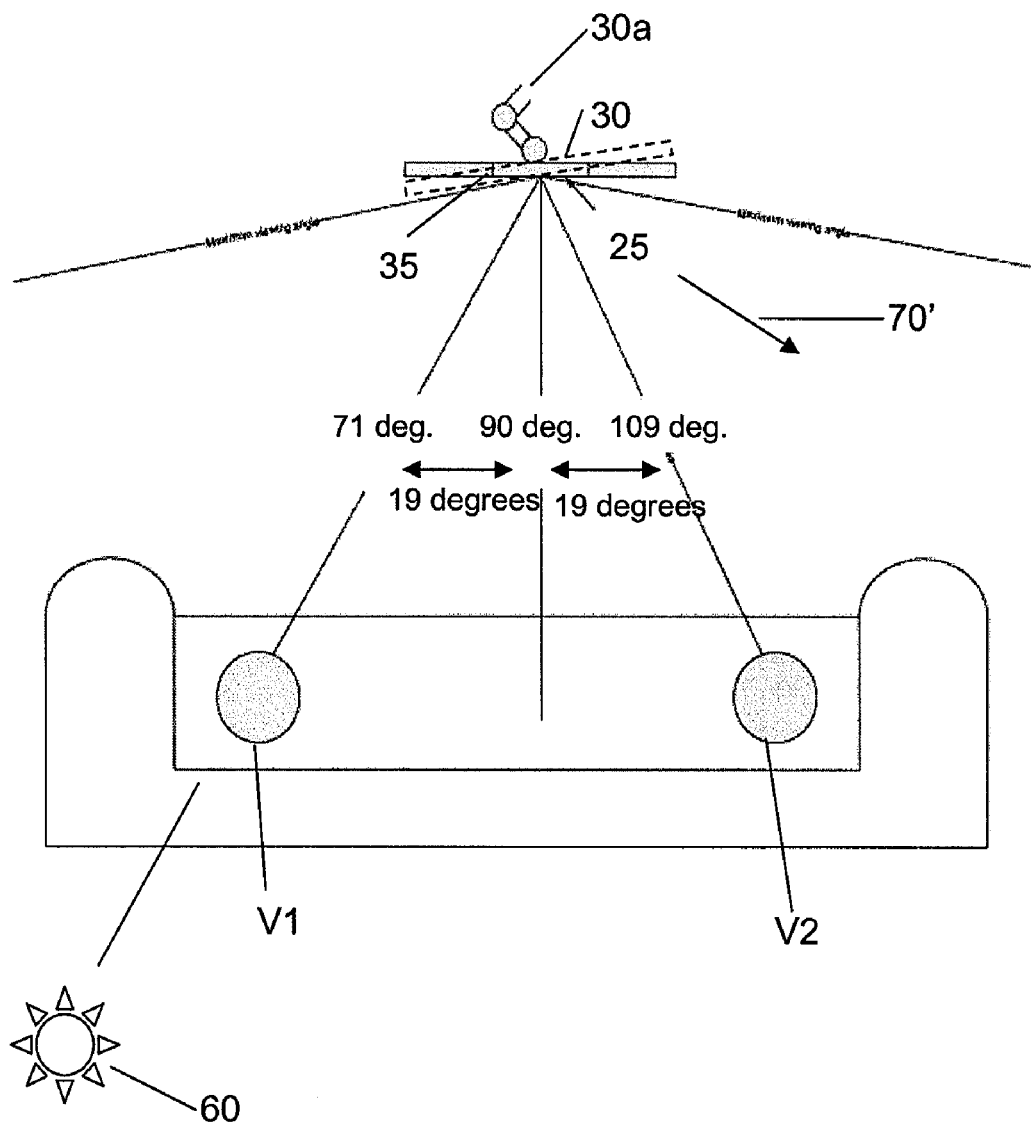

Alternatively, for example, the computing device 14 may determine a lighting adjustment, such that the display 30 is positioned as shown by the dashed lines in FIG. 12. With the display 30 positioned as shown by the dashed lines in FIG. 12, the light source 60 is reflected along path 70' beyond V2, so that neither V1 or V2 are affected by the glare. Moreover, with the display 30 positioned as shown by the dashed lines in FIG. 12, both V1 and V2 are still presented with a sufficient view of the display 30. However, by positioning the display 30 as shown in FIG. 12, the angle of incidence is increased. Thus, while the reflected glare directed away from the viewers, the energy of the reflected glare is increased.

Additionally, in embodiments, when the computing device determines alternative lighting adjustments for the same lighting conditions, e.g., FIGS. 11 and 12, the computing device 14 may provide the viewers (e.g., V1 and V2) with a choice of lighting adjustments. In embodiments, for example, a viewer may be presented with a choice of lighting adjustments via the display 30, or the stand or mount 30*a*. Alternatively, the computing device 14 may temporarily, e.g., for 10 seconds or a user-configurable period of time, move the display 30 in accordance with the different lighting adjustments, so that the viewer(s) may observe the position of the display 30 in accordance with the different lighting adjustments. Moreover, a viewer may indicate a choice of lighting adjustment, e.g., via buttons on the display 30 or the stand or mount 30*a*, or via the control "C". Furthermore, the viewer's selected choice of lighting adjustment and the current viewing conditions (e.g., time of day, day of year, viewers' positions, and current lighting conditions) may be stored in storage 22B of FIG. 1 for later recall and use, as described further below.

Figure 13:
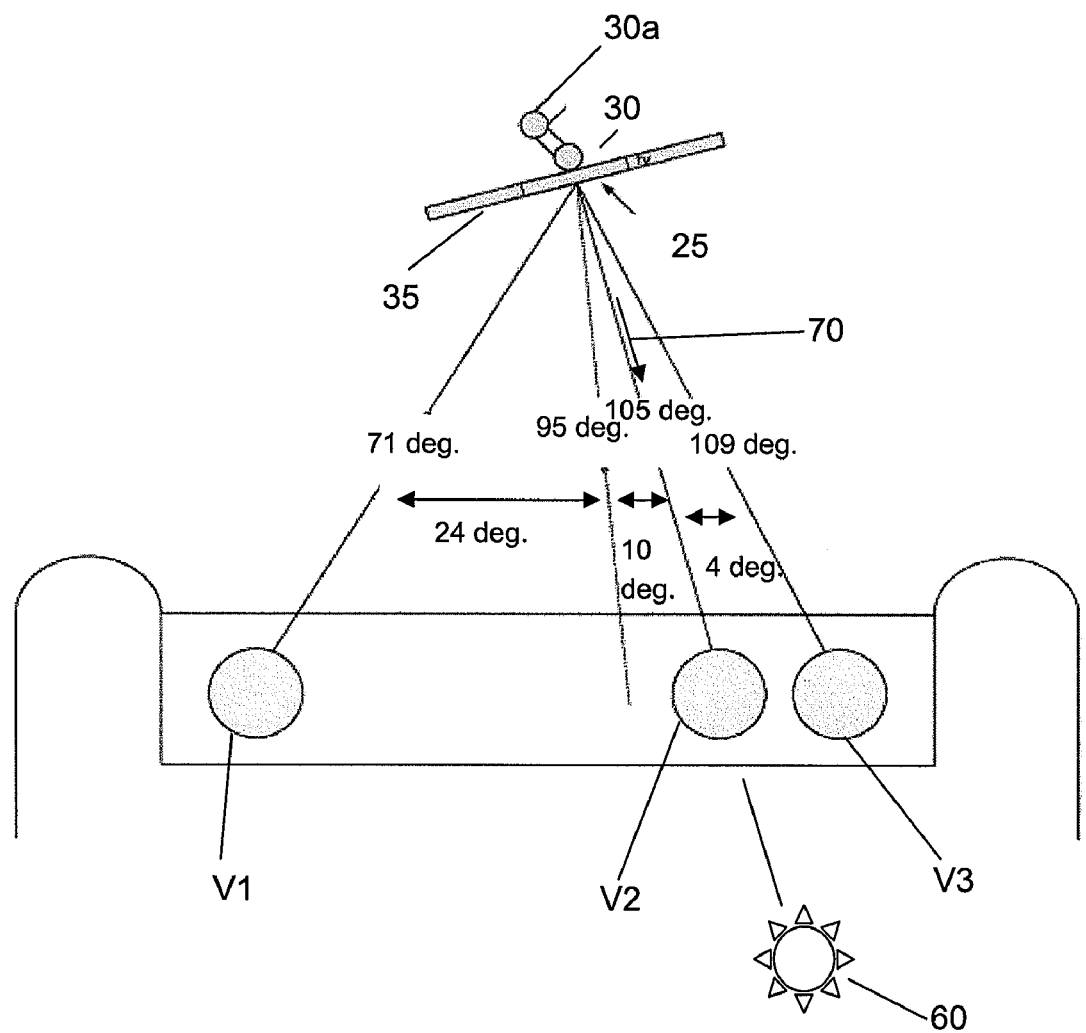
Figure 14:
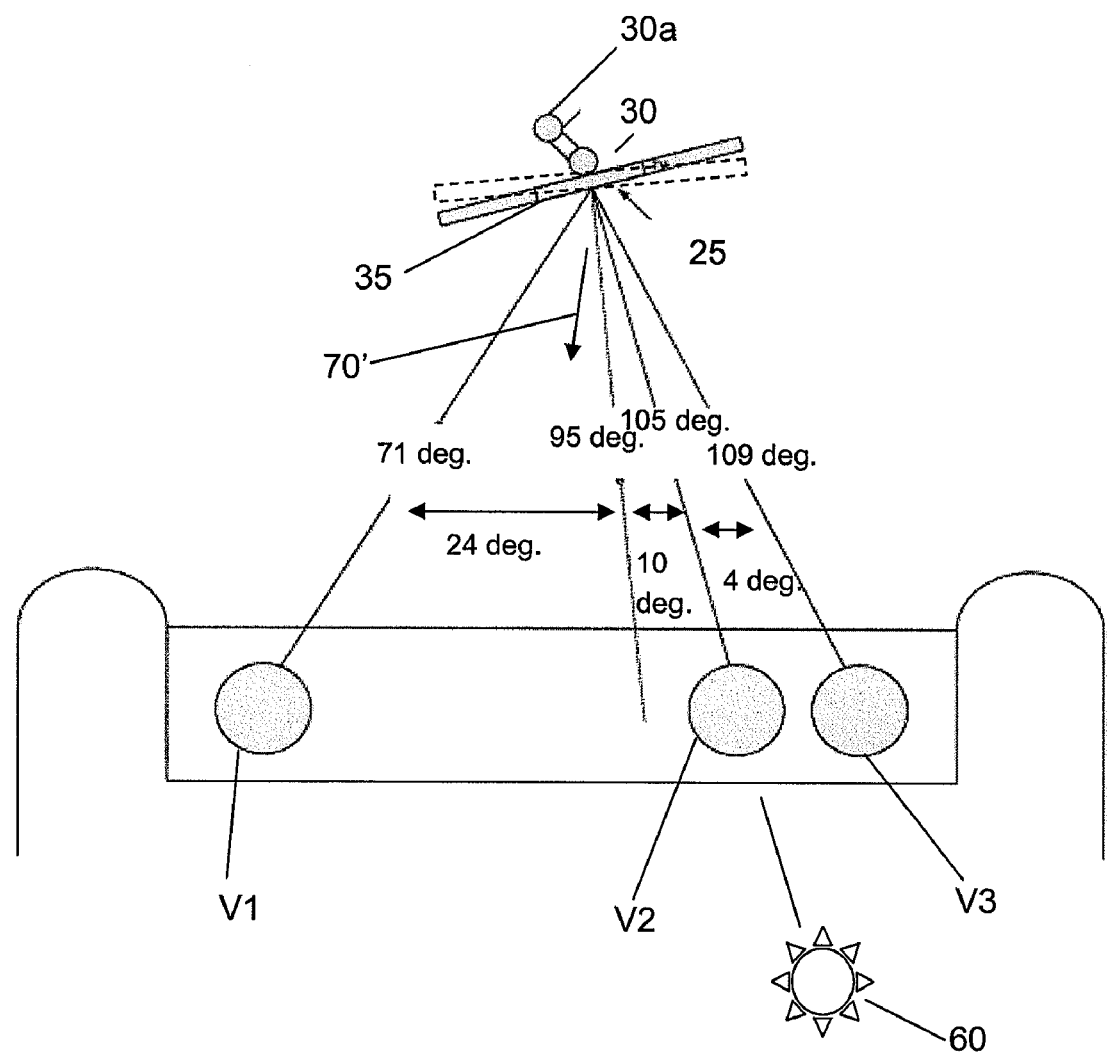

FIG. 13 shows another lighting scenario under which the computing device 14 may determine a lighting adjustment. As shown in FIG. 13, the light source 60 (e.g., the Sun, or other interior or exterior light) is positioned relative to the display 30 such that the light source 60 is reflected along path 70 and produces a glare for V2. Thus, according to the invention, the computing device 14 may determine a lighting adjustment, such that the display 30 is positioned as shown by dashed lines in FIG. 14. With the display 30 positioned as shown by dashed lines in FIG. 14, the light source 60 is reflected off the display 30 and directed along path 70', which does not lie in the path of the viewers V1, V2 and V3. Additionally, with the display 30 positioned as shown by the dashed lines in FIG. 14, each of the viewers is still provided with a sufficient view of the display 30. While, not shown, it should be understood that, with the example shown in FIG. 13, the display 30 could be rotated counter-clockwise (as opposed to the clockwise rotation of display 30 shown in FIG. 14). However, a counter-clockwise rotation of the display 30 under the conditions of FIG. 13 may undesirably diminish the view of V1, as the display 30 is rotated further away from V1.

Figure 15:
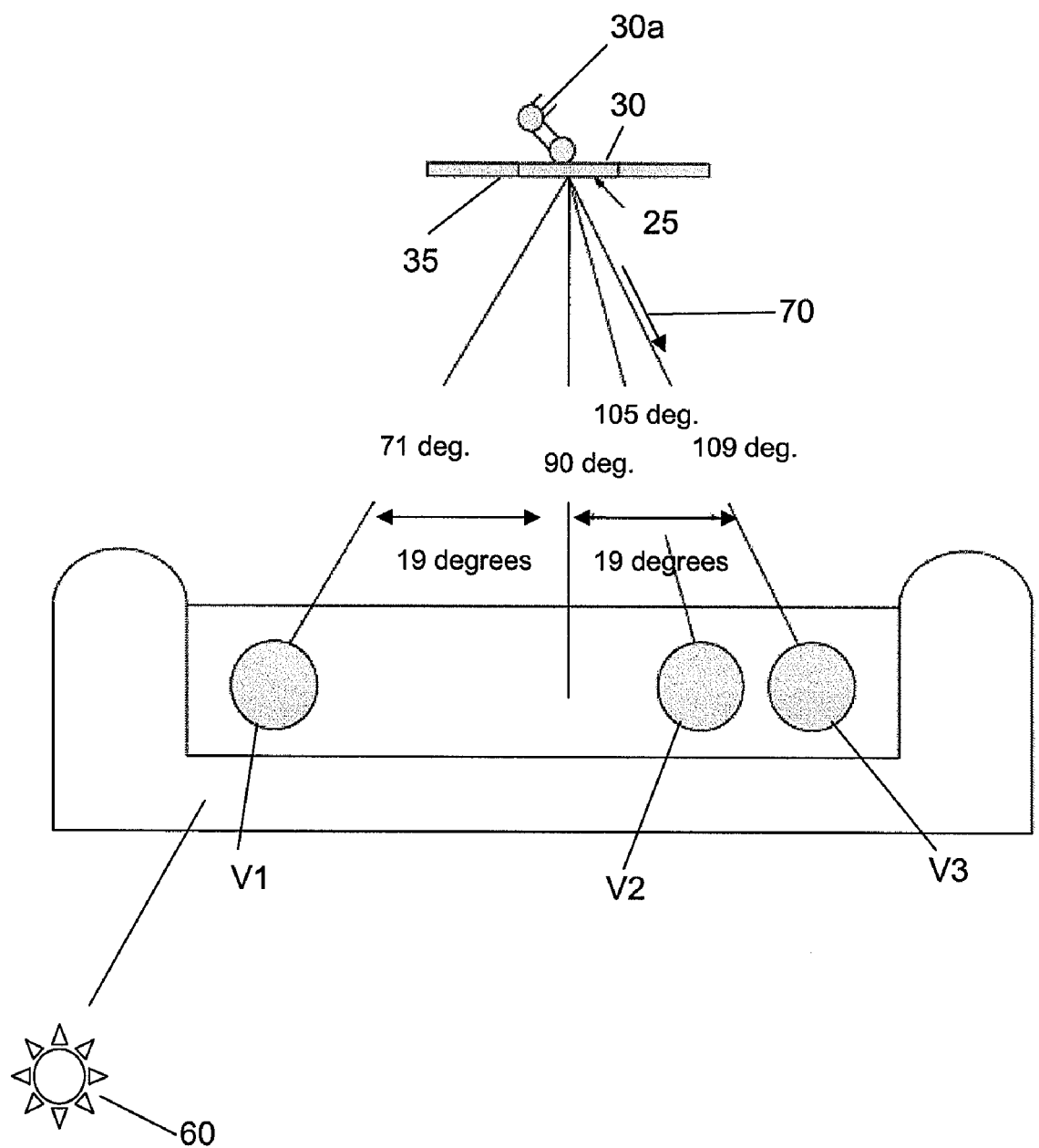
Figure 16:
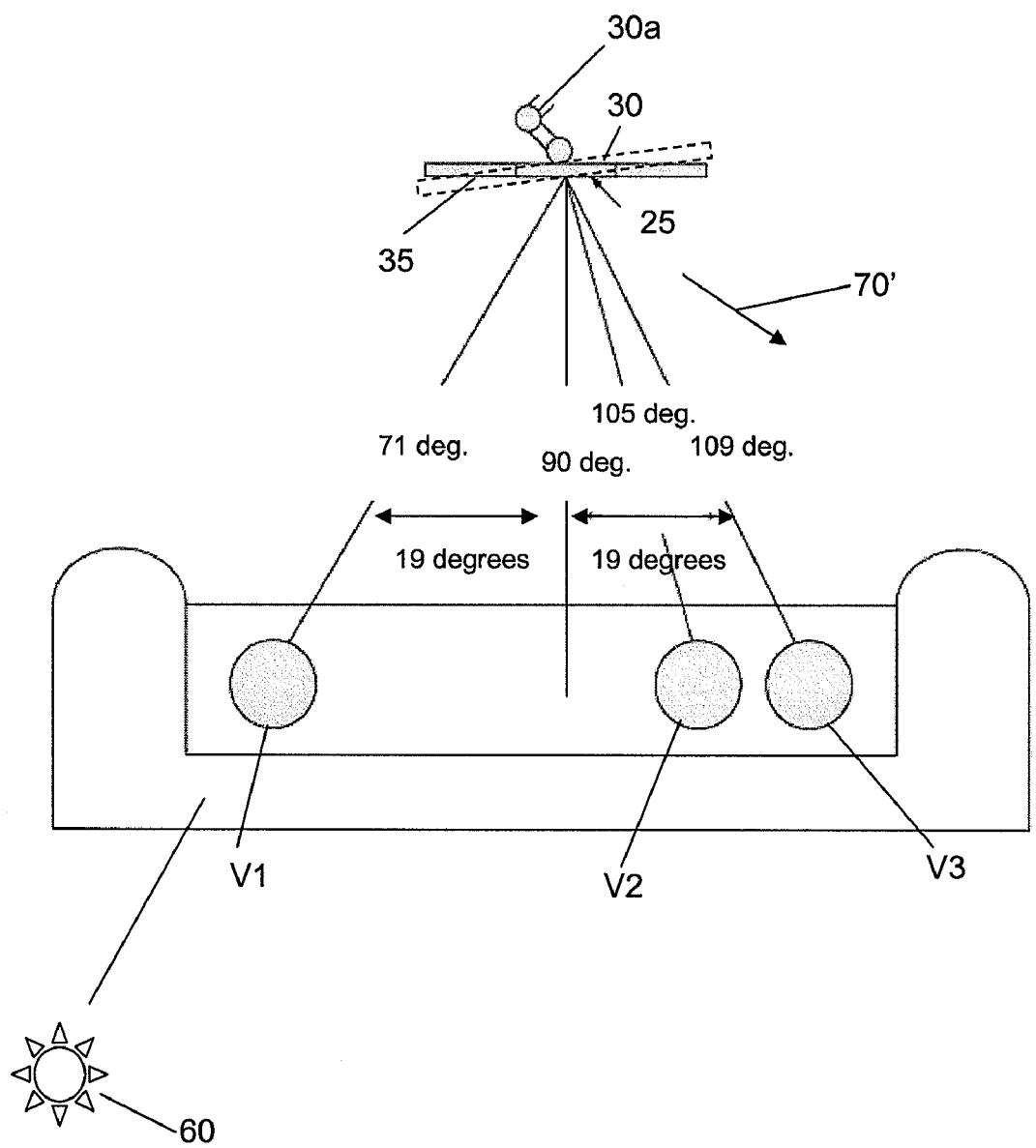
Figure 17:
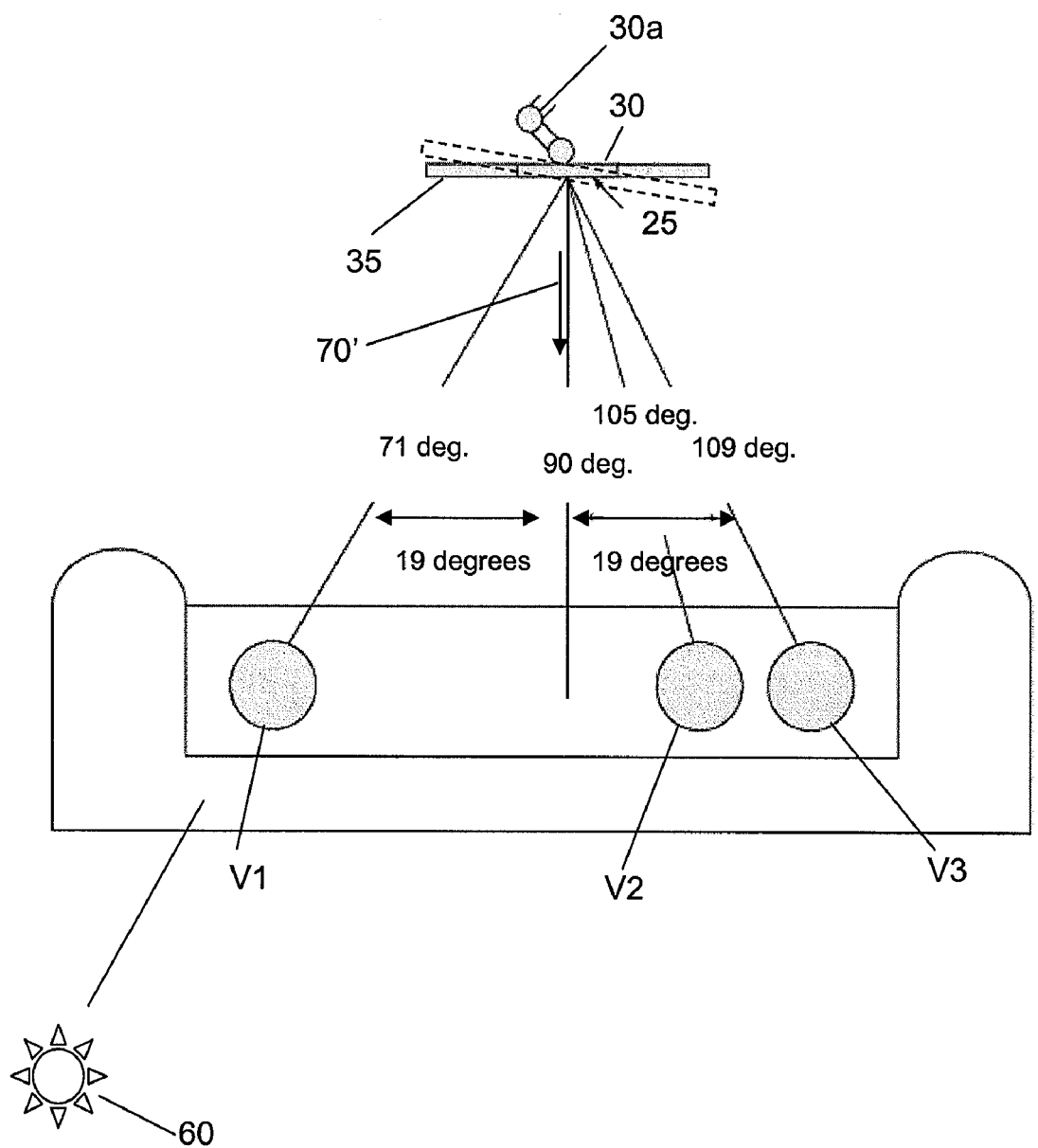

FIG. 15 shows another lighting scenario under which the computing device 14 may determine a lighting adjustment. As shown in FIG. 15, the light source 60 (e.g., the Sun, or other interior or exterior light) is positioned relative to the display 30 such that the light source 60 is reflected along path 70 and produces a glare for V3. Thus, according to the invention, the computing device 14 may determine a lighting adjustment, such that the display 30 is positioned as shown by dashed lines in FIG. 16. With the display 30 positioned as shown by dashed lines in FIG. 16, the light source 60 is reflected off the display 30 and directed along path 70', which does not lie in the path of the viewers V1, V2 and V3. Additionally, with the display 30 positioned as shown by the dashed lines in FIG. 16, each of the viewers is still provided with a sufficient view. Alternatively, for example, the computing device 14 may determine a lighting adjustment, such that the display 30 is positioned as shown by the dashed lines in FIG. 17. With the display 30 positioned as shown by the dashed lines in FIG. 17, the light source 60 is reflected along path 70' to an area between V1 and V2, so that V1, V2 and V3 are not affected by the glare. Moreover, with the display 30 positioned as shown by the dashed lines in FIG. 17, V1, V2 and V3 are still presented with a sufficient view of the display 30.

Figure 18:
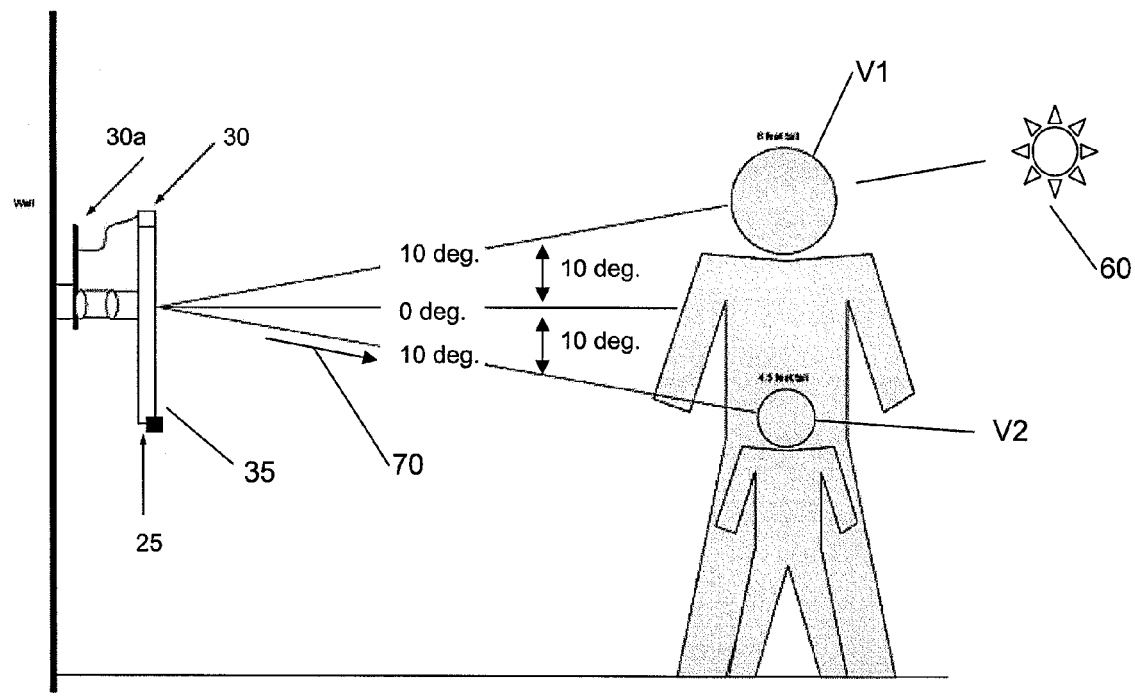

FIG. 18 shows another lighting scenario under which the computing device 14 may determine a lighting adjustment. As shown in FIG. 18, the light source 60 (e.g., the Sun, or other interior or exterior light) is positioned relative to the display 30 such that the light source 60 is reflected along path 70 and produces a glare for V2. Thus, according to the invention, the computing device 14 may determine a lighting adjustment, such that the display 30 is positioned as shown by dashed lines in FIG. 19. With the display 30 positioned as shown by dashed lines in FIG. 19, the light source 60 is reflected off the display 30 and directed along path 70', which does not lie in the path of viewers V1 and V2. Alternatively, for example, the computing device 14 may determine a lighting adjustment, such that the display 30 is positioned as shown by the dashed lines in FIG. 20. With the display 30 positioned as shown by the dashed lines in FIG. 20, the light source is reflected along path 70' to an area beyond V2, so that V1 and V2 are not affected by the glare. Moreover, with the display 30 positioned as shown by the dashed lines in FIG. 20, V1 and V2 are still presented with a sufficient view of the display 30.

After determining the lighting adjustment, the computing device 14 may control the display 30 (or the stand or mount 30*a*) to be positioned in accordance with the viewer adjustment and the lighting adjustment, as described above.

Additional Embodiments

In addition, it is contemplated that the system is configurable to preferences of certain viewers. By way of example, the facial recognition technology can be used to identify one or more particular viewers and, remembering their viewing habits or other preferences, automatically adjust the viewing angle to their preferences. The preferences may be stored in the storage 22B of FIG. 1. As another example, the preferences may indicated that the viewing angle should not change if the viewer only moves within a predetermined distance, e.g., within 10 inches of the originally detected location.

In embodiments, the computing system 14 may include an internal clock allowing for a determination of the time of day and day of year. When the display 30 is adjusted to account for the current viewers and current lighting conditions, the computing device 14 may store the parameters for the adjustment (e.g., the particular viewer positions, the particular lighting conditions and the resultant adjusted position of the display 30) in the storage system 22B of FIG. 1. Moreover, after determining a viewer adjustment and a lighting adjustment, the computing device 14 may direct the display 30 to be moved to an adjusted position. However, the viewer (or viewers) may not be satisfied with the adjusted position of the display 30 as determined by the computing device 14. Thus, the viewer may further adjust the position of the display 30, e.g., via control C. Moreover, these further adjustments may be stored in storage 22B. Thus, if the computing device 14, detects similar viewer conditions and lighting conditions, rather than adjusting the display 30 based on the current conditions or in accordance with the stored display position for the same conditions, the computing device may adjust the display 30 in accordance with the viewer's preferences (e.g., utilizing the viewer's previous additional adjustments for these viewing conditions).

Additionally, the relative position of some light sources, e.g., the Sun, with respect to the display 30 may be cyclical. That is, for example, from year-to-year, the position of the Sun is located in the same position relative to a display (assuming the overall position of the display 30 has not changed). Thus, the computing device 14 may "learn" the relative position of the Sun (or other cyclical source of light, e.g., the Moon) with respect to the display 30 based on the time of day and day of year. Accordingly, in embodiments, the computing device 14 may determine a position of the display 30, at least in part, based on the stored temporal data (e.g., the time of day, and the day of year).

Figure 19:
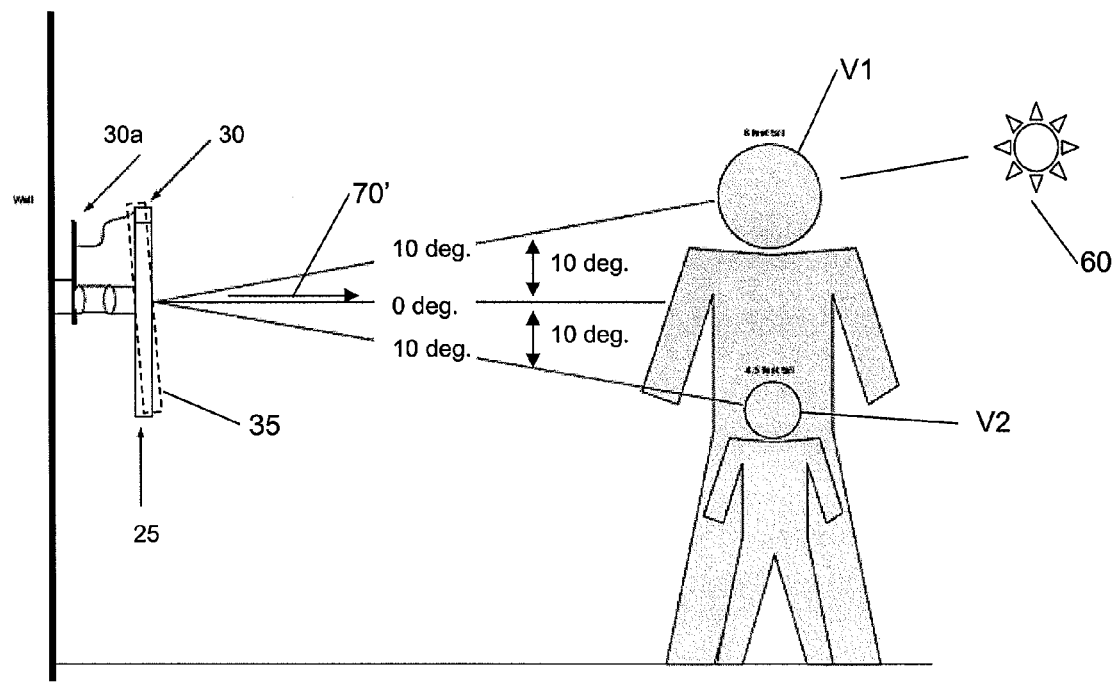
Figure 20:
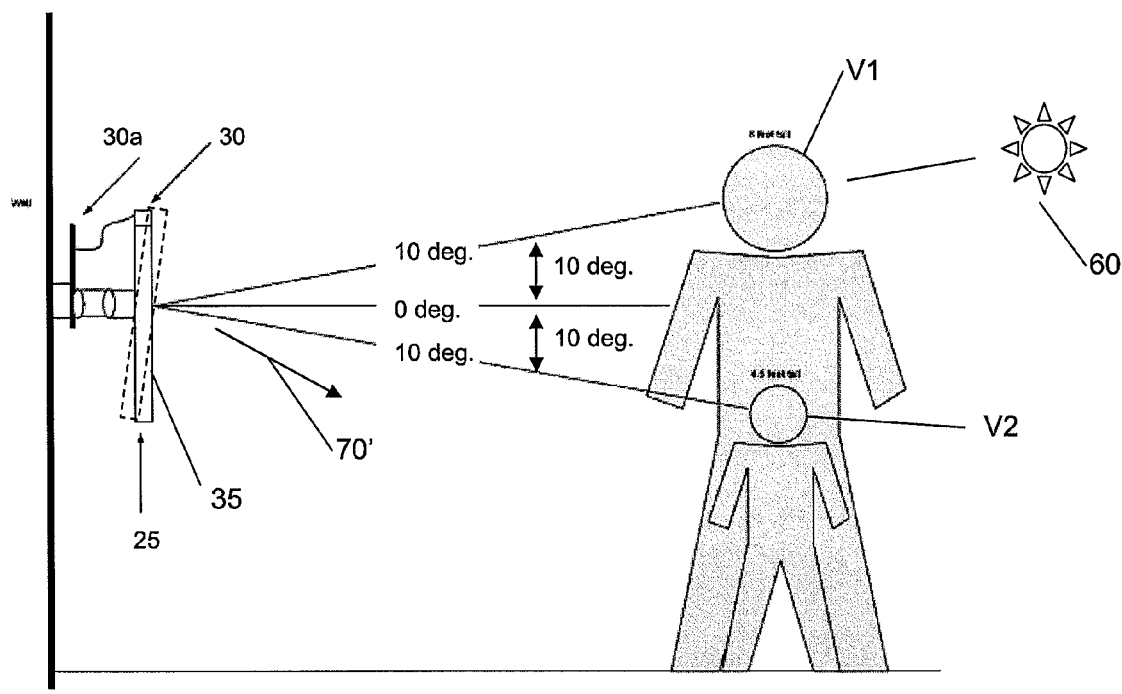

Moreover, while the invention has been described above as determining the location of the viewer(s) prior to a determination of the current lighting conditions, the invention contemplates that the determination of current lighting conditions may precede the determination of the location of the viewers. For example, with the display 30 mounted in a storefront window for, e.g., presenting advertisements to passing viewers, the computing device may determine the current lighting conditions and adjust the display 30 to direct any glare away from the passing or static viewers. More specifically, for example, the light sensor 25 may detect a light source, e.g., the Sun, incident on the display 30 from an angle above the horizon (similar to the scenario depicted in FIG. 18) and the computing device 14 may determine a lighting adjustment such that the display 30 is angularly adjusted about the display's horizontal axis (as shown in FIG. 19) to minimize glare to a viewer of, e.g., average height. Then, as described above, the computing system may utilize the viewer sensor 35 to track, e.g., passing or static viewers and adjust the position of the display 30 about the vertical axis of the display 30.

Flow Diagram

Figure 21:
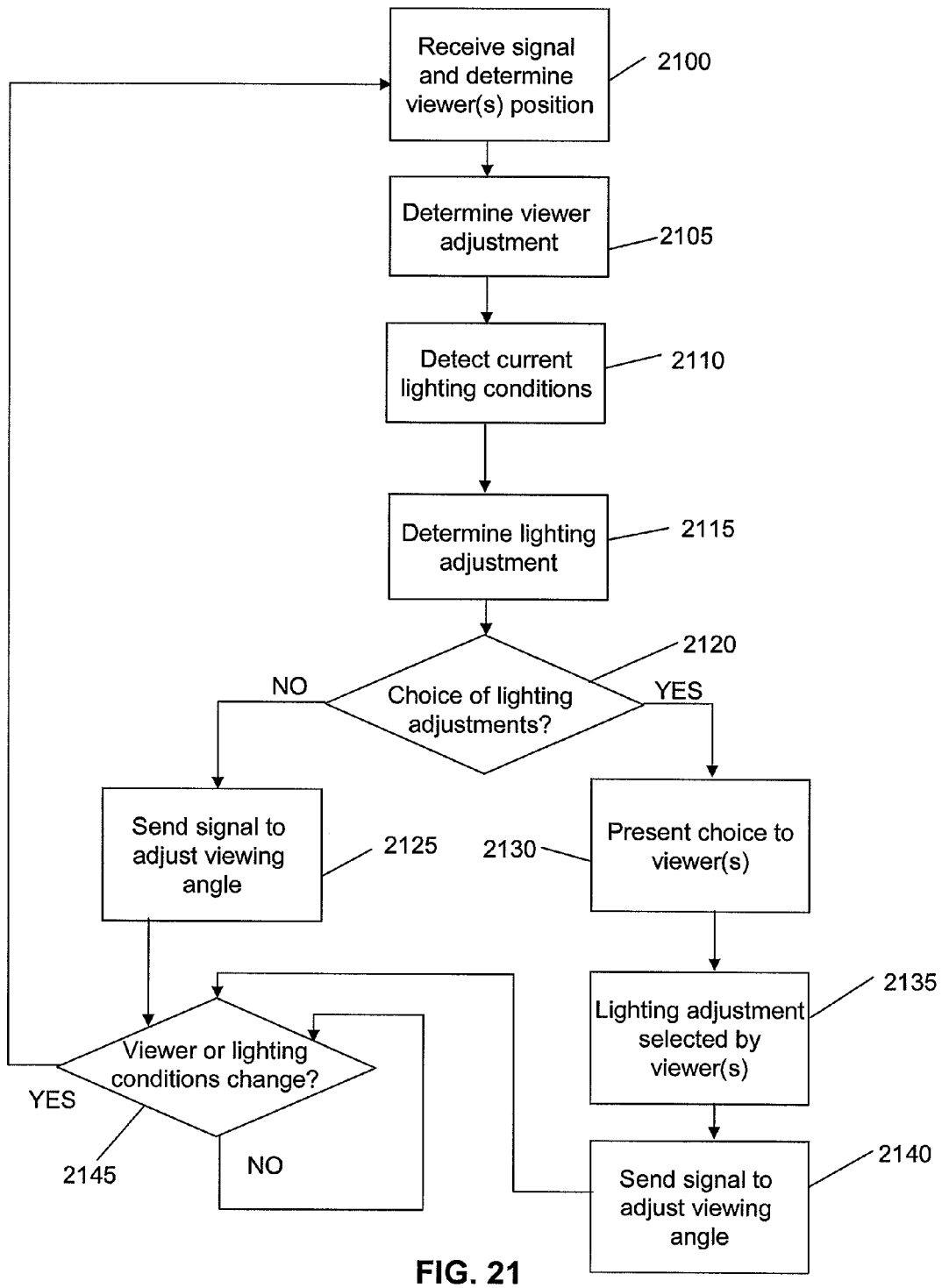
FIG. 21 shows a flow diagram implementing processes in accordance with aspects of the invention.

FIG. 21 is a flow diagram for implementing processes of the invention, which may be implemented in the environment of FIG. 1. FIG. 21 equally represents a high-level block diagram of the invention. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 21, at step 2100, the computing device receives a signal from a viewer sensor(s) and determines whether one or more viewers are within a viewing distance of the display. At step 2105, the computing device determines the viewer adjustment based on the received signal from viewer sensor(s). At step 2110, the light sensor(s) detects current lighting conditions. At step 2115, the computing device determines the lighting adjustment based on the detected current lighting conditions. At step 2120, the computing device determines if there is more than one feasible lighting adjustment. If, at step 2120, the computing device determines there is more than one feasible lighting adjustment, at step 2130, the computing device presents the choice of lighting adjustments to the viewer(s). At step 2135, a lighting adjustment is selected by the viewer(s). At step 2140, the computing device sends a signal to the display (or the stand or mount) to adjust the viewing angle in accordance with the viewer adjustment and the selected lighting adjustment. If, at step 2120, the computing device determines there is only one feasible lighting adjustment, at step 2125, the computing device sends a signal to the display (or the stand or mount) to adjust the viewing angle in accordance with the viewer adjustment and the lighting adjustment. At step 2145, the computing device determines whether the viewer or lighting conditions have changed. In embodiments, the viewer sensor(s) and the lighting sensor(s) are run in real-time or at predetermined intervals to detect if the viewer or light conditions have changed. If, at step 2145, the computing device determines that neither the viewer or lighting conditions have changed, then the process continues at step 2145. If, at step 2145, the computing device determines that either the viewer or lighting conditions have changed, then the process continues at step 2100.

It should be understood, that while the steps have been described as occurring in a particular order, the invention contemplates that the steps may be performed in other orders. For example, step 2110 may occur prior to step 2105. Additionally, for example, step 2110 may occur prior to step 2100. Furthermore, the invention contemplates that, in embodiments, steps may be implied or omitted while still remaining true to this invention.

While the invention has been described in terms of embodiments, those skilled in the art will recognize that the invention can be practiced with modifications and in the spirit and scope of the appended claims.

What is claimed is:

1. A method for adjusting a viewing angle of a display, the method comprising the steps of:
   a computing device determining a location of a viewer of the display;
   the computing device determining an angle of sun light incident to the display;
   the computing device determining, based on the location of the viewer of the display and the angle of the sun light incident to the display, an adjusted angle of the display relative to the viewer of the display to substantially avoid glare on the viewer of the display caused by the sun light incident on the display and controlling a motor for the display to move the display to the adjusted angle of the display relative to the viewer of the display.

2. The method of claim 1 wherein the motor moves the display by rotating the display.

3. The method of claim 1 wherein the computing device determines a location of another viewer of the display who is viewing the display concurrently with the first said viewer of the display, and the computing device determines, based on the locations of both viewers of the display and the angle of the sun light incident to the display, the adjusted angle to substantially avoid glare on both viewers of the display caused by the sun light incident on the display.

4. The method of claim 1 wherein the angle of the sun light relative to the display changes with time, and in response, the computing device dynamically re-determines an adjustment to the angle of the display relative to the viewer to substantially avoid glare on the viewer of the display caused by the sun light incident on the display as the angle of the sun light relative to the display changes with time.

5. The method of claim 1 wherein the computing device determines the location of the viewer of the display based on data from a sensor or a camera.

6. The method of claim 1 wherein the computing device determines the angle of sun light incident to the display based on data from a light sensor.

7. A computer program product for adjusting a viewing angle of a display, the computer program product comprising:
   one or more computer-readable tangible storage devices and program instructions stored on at least one of the one or more storage devices, the program instructions comprising;
   program instructions to determine a location of a viewer of the display;
   program instructions to determine an angle of sun light incident to the display;
   program instructions to determine, based on the location of the viewer of the display and the angle of the sun light incident to the display, an adjusted angle of the display relative to the viewer of the display to substantially avoid glare on the viewer of the display caused by the sun light incident on the display and control a motor for the display to move the display to the adjusted angle of the display relative to the viewer of the display.

8. The computer program product of claim 7 wherein the motor moves the display by rotating the display.

9. The computer program product of claim 7 wherein the program instructions to determine a location of a viewer of the display also determines a location of another viewer of the display who is viewing the display concurrently with the first said viewer of the display, and the program instructions to determine an adjusted angle of the display relative to the viewer of the display determines the adjusted angle based on the locations of both viewers of the display and the angle of the sun light incident to the display, to substantially avoid glare on both viewers of the display caused by the sun light incident on the display.

10. The computer program product of claim 7 wherein the angle of the sun light relative to the display changes with time, and in response, the program instructions to determine an adjusted angle of the display relative to the viewer of the display dynamically re-determines an adjustment to the angle of the display relative to the viewer to substantially avoid glare on the viewer of the display caused by the sun light incident on the display as the angle of the sun light relative to the display changes with time.

11. The computer program product of claim 7 wherein the program instructions to determine a location of a viewer of the display determines the location of the viewer of the display based on data from a sensor or a camera.

12. The computer program product of claim 7 wherein the program instructions to determine an angle of sun light incident to the display determines the angle of sun light incident to the display based on data from a light sensor.

13. A computer system for adjusting a viewing angle of a display, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine a location of a viewer of the display;

program instructions to determine an angle of sun light incident to the display;

program instructions to determine, based on the location of the viewer of the display and the angle of the sun light incident to the display, an adjusted angle of the display relative to the viewer of the display to substantially avoid glare on the viewer of the display caused by the sun light incident on the display and control a motor for the display to move the display to the adjusted angle of the display relative to the viewer of the display.

14. The computer system of claim 13 wherein the motor moves the display by rotating the display.

15. The computer system of claim 13 wherein the program instructions to determine a location of a viewer of the display also determines a location of another viewer of the display who is viewing the display concurrently with the first said viewer of the display, and the program instructions to determine an adjusted angle of the display relative to the viewer of the display determines the adjusted angle based on the locations of both viewers of the display and the angle of the sun light incident to the display, to substantially avoid glare on both viewers of the display caused by the sun light incident on the display.

16. The computer system of claim 13 wherein the angle of the sun light relative to the display changes with time, and in response, the program instructions to determine an adjusted angle of the display relative to the viewer of the display dynamically re-determines an adjustment to the angle of the display relative to the viewer to substantially avoid glare on the viewer of the display caused by the sun light incident on the display as the angle of the sun light relative to the display changes with time.

17. The computer system of claim 13 wherein the program instructions to determine a location of a viewer of the display determines the location of the viewer of the display based on data from a sensor or a camera.

18. The computer system of claim 13 wherein the program instructions to determine an angle of sun light incident to the display determines the angle of sun light incident to the display based on data from a light sensor.

* * * * *